US012646502B1

(12) United States Patent (10) Patent No.: US 12,646,502 B1

Phan et al. (45) Date of Patent: Jun. 2, 2026

(54) ACOUSTIC EVENT DETECTION

(71) Applicant: Amazon Technologies, Inc., Seattle, WA (US)

(72) Inventors: Quoc Huy Phan, Bromley (GB); Byeonggeun Kim, Toronto (CA); Andrew Thomas Bydlon, North Adams, MA (US); Qingming Tang, Belmont, WA (US); Chieh-Chi Kao, Kirkland, WA (US); Chao Wang, Newton, MA (US); Tien Vu Nguyen, Black Forest (AU)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 18/524,377

(22) Filed: Nov. 30, 2023

(51) Int. Cl.
$G10L\ 15/06$ (2013.01)
$G10L\ 15/32$ (2013.01)

(52) U.S. Cl.
CPC ............ G10L 15/063 (2013.01); G10L 15/32 (2013.01)

(58) Field of Classification Search
CPC .............................. G10L 15/063; G10L 15/32
See application file for complete search history.

(56) References Cited

U.S. PATENT DOCUMENTS 10,249,293 B1 *  4/2019  Mossoba ................. G10L 21/16
11,495,215 B1 * 11/2022  Wu ........................ G10L 15/063
2018/0322961 A1 * 11/2018  Kim ........................ G16H 50/20
2018/0358019 A1 * 12/2018  Mont-Reynaud ....... G10L 15/30
2019/0043529 A1 *  2/2019  Muchlinski ............. G10L 15/22
2019/0311720 A1 * 10/2019  Pasko ...................... G06F 3/167
2019/0318735 A1 * 10/2019  Chao ...................... G10L 15/14
2020/0118544 A1 *  4/2020  Lee ........................ G10L 15/063
2020/0244716 A1 *  7/2020  Mehta ..................... H04L 65/65
2022/0059077 A1 *  2/2022  Thomson .............. G10L 15/065
2022/0358908 A1 * 11/2022  Gandhe ................. G10L 15/065
2023/0298575 A1 *  9/2023  Sharifi ................... G10L 15/22
704/254

(Continued)

OTHER PUBLICATIONS

Panteli, et al., "Sparse-shot learning with exclusive cross-entropy for extremely many localisations," in Proc. ICCV, 2021, pp. 2793-2803.

(Continued)

*Primary Examiner* — Michael Colucci
(74) *Attorney, Agent, or Firm* — Pierce Atwood LLP

(57) ABSTRACT

Techniques for reducing occurrences of cross-triggering event types not represented in audio data and false detection of event types are described. Different event types, such as a hand clap event type and a door knock event type may have substantially similar audio characteristics, and if one event type of such event types is represented in audio data, then event detection processing of that audio data may lead to detection of event types not represented in the audio data. Example embodiments involve training a model configured to detect multiple event types to enforce mutual exclusivity between different event type pairs or sets of the multiple event types. The model is trained to enforce mutual exclusivity using a regularizer function and a weight parameter to reduce any positive detection scores of event types not represented in received audio. Similar techniques may be applied to models for object detection using image data.

20 Claims, 16 Drawing Sheets

(56) References Cited

U.S. PATENT DOCUMENTS

2024/0412728 A1* 12/2024 Peterson ................. G10L 15/16
2025/0046298 A1* 2/2025 Fedorov ............... G10L 15/063

OTHER PUBLICATIONS

Sajjadi, et al., "Mutual exclusivity loss for semi-supervised deep learning," in Proc. ICIP, 2016, pp. 1908-1912.

Xie, et al., "Partial multilabel learning with noisy label identification," IEEE Transactions on Pattern Analysis and Machine Intelligence, vol. 44, No. 7, pp. 3676-3687, 2021.

Mesaros, et al., "Real-world acoustic event detection," IEEE Signal Process. Mag., vol. 38, No. 5, pp. 67-83, 2021.

Bilen, et al., "A framework for the robust evaluation of sound event detection," in 2020 IEEE International Conference on Acoustics, Speech and Signal Processing, ICASSP 2020, Barcelona, Spain, May 4-8, 2020. 2020, pp. 61-65, IEEE.

Phan, et al., "Unifying isolated and overlapping audio event detection with multi-label multi-task convolutional recurrent neural networks," in ICASSP 2019-2019 IEEE International Conference on Acoustics, Speech and Signal Processing (ICASSP). IEEE, 2019, pp. 51-55.

Tsoumakas, et al., "Multi-label classification: An overview," International Journal of Data Warehousing and Mining (IJDWM), vol. 3, No. 3, pp. 1-13, 2007.

Cakir, et al., "Convolutional recurrent neural networks for polyphonic sound event detection," IEEE/ACM Trans. on Audio, Speech, and Language Processing, vol. 5, No. 6, pp. 1291-1303, 2017.

Lanchantin, et al., "General multi-label image classification with transformers," in Proceedings of the IEEE/CVF Conference on Computer Vision and Pattern Recognition, 2021, pp. 16478-16488.

Vafeiadis, et al, "Audio content analysis for unobtrusive event detection in smart homes," Engineering Applications of Artificial Intelligence, vol. 89, No. 103226, 2020.

Serizel, et al., "Sound event detection in synthetic domestic environments," in Proc. ICASSP, 2020, pp. 86-90.

Alsina-Pages, et al., "Homesound: Real-time audio event detection based on high performance computing for behaviour and surveillance remote monitoring," Sensors, vol. 17, No. 4, pp. 854, 2017.

Pham, et al., "CNN-MoE based framework for classification of respiratory anomalies and lung disease detection," IEEE Journal of Biomedical and Health Informatics, vol. 25, No. 8, pp. 2938-2947, 2021.

Lykartsis, et al., "A prototype deep learning system for the acoustic monitoring of intensive care patients," in Proc. EUSIPCO, 2021, pp. 980-984.

Ioffe, et al., "Batch normalization: Accelerating deep network training by reducing internal covariate shift," in Proc. ICML, 2015, pp. 448-456.

Nair, et al., "Rectified linear units improve restricted Boltzmann machines," in Proc. ICML, 2010.

* cited by examiner

FIG. 1A

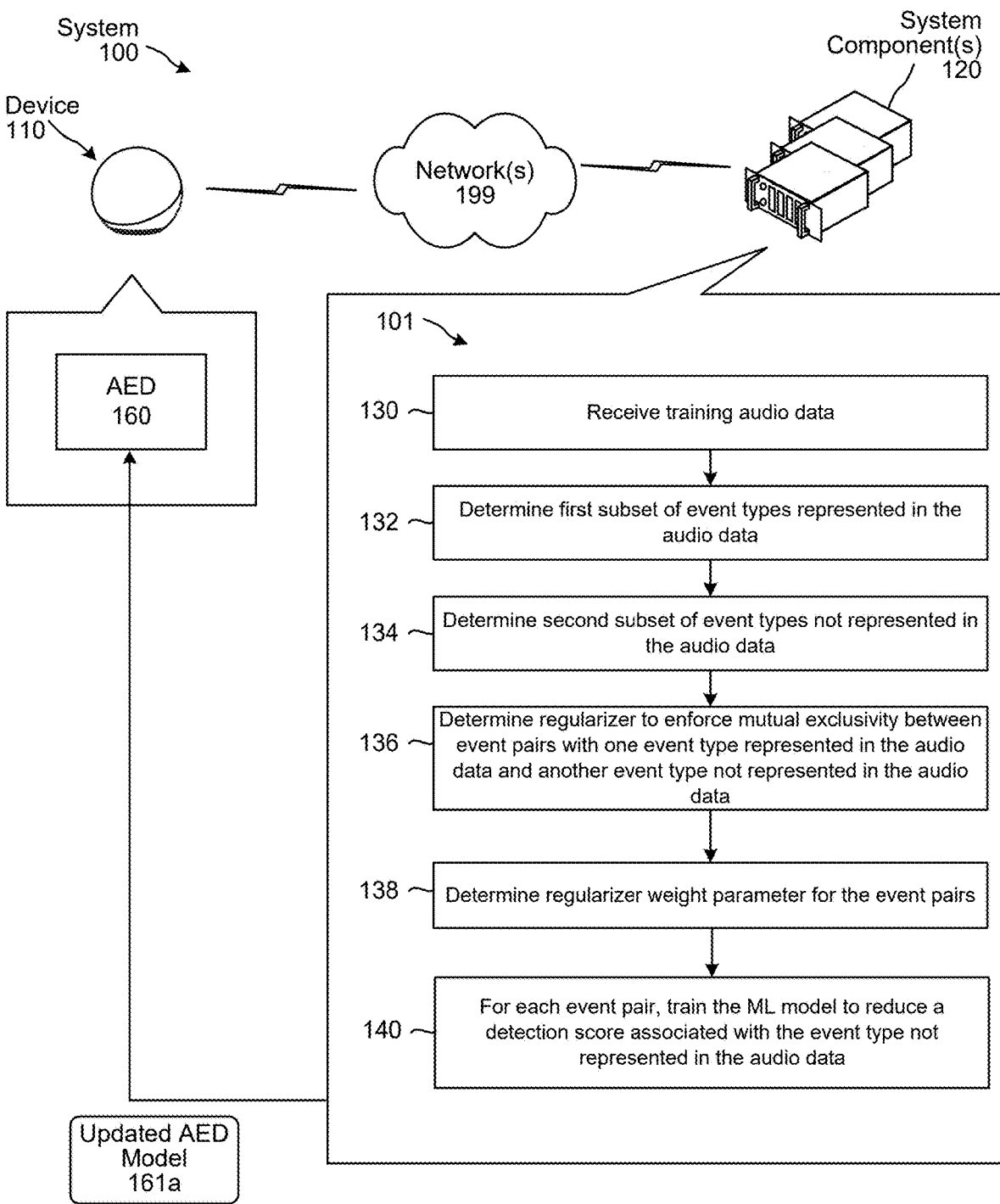

System
100

System
Component(s)
120

Device
110

Network(s)
199

101

AED
160

| | |
|---|---|
| 130 | Receive training audio data |
| 132 | Determine first subset of event types represented in the audio data |
| 134 | Determine second subset of event types not represented in the audio data |
| 136 | Determine regularizer to enforce mutual exclusivity between event pairs with one event type represented in the audio data and another event type not represented in the audio data |
| 138 | Determine regularizer weight parameter for the event pairs |
| 140 | For each event pair, train the ML model to reduce a detection score associated with the event type not represented in the audio data |

Updated AED
Model
161a

FIG. 1C

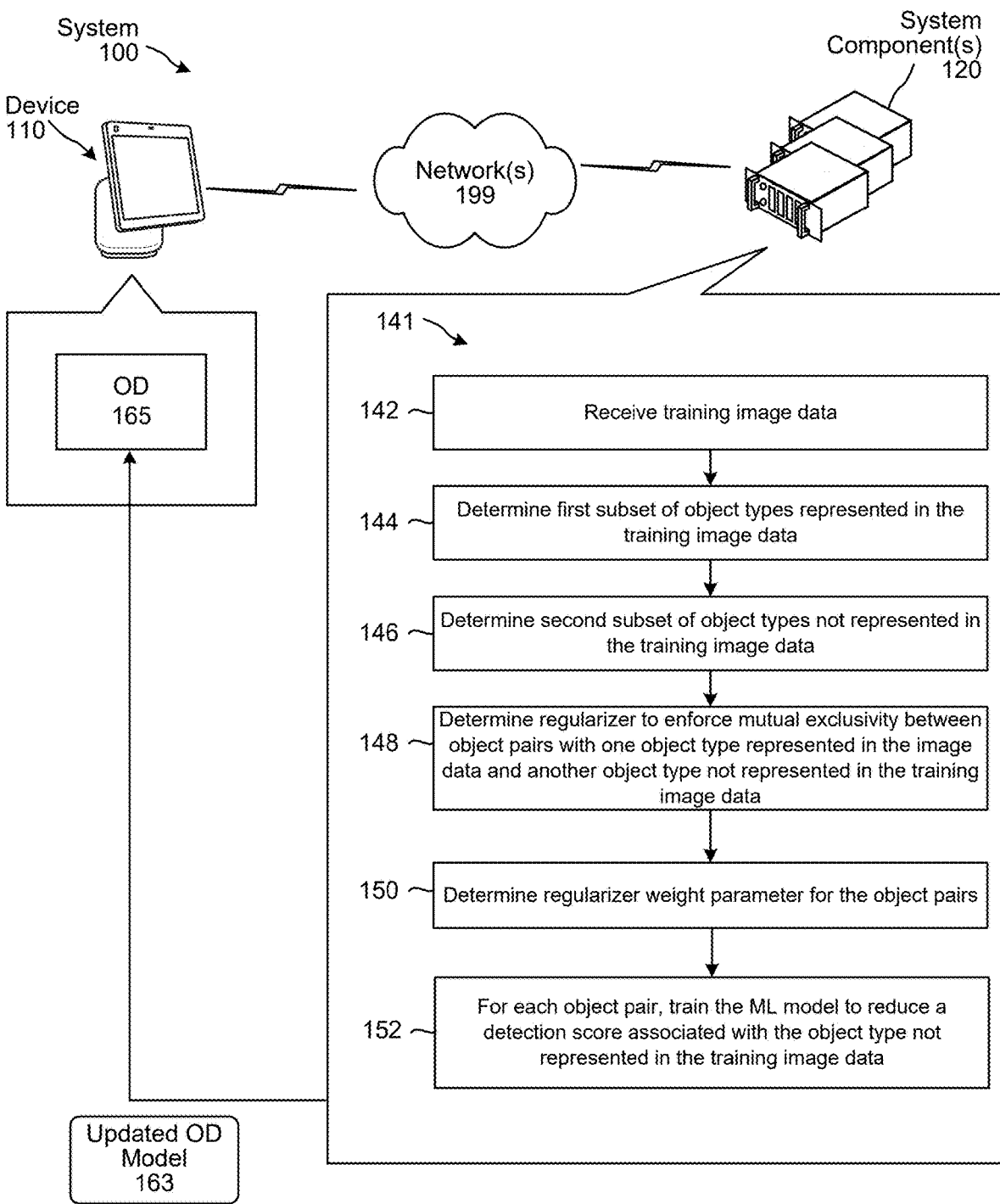

System 100

Device 110

Network(s) 199

System Component(s) 120

OD 165

141

142 — Receive training image data

144 — Determine first subset of object types represented in the training image data 146 — Determine second subset of object types not represented in the training image data 148 — Determine regularizer to enforce mutual exclusivity between object pairs with one object type represented in the image data and another object type not represented in the training image data 150 — Determine regularizer weight parameter for the object pairs 152 — For each object pair, train the ML model to reduce a detection score associated with the object type not represented in the training image data Updated OD Model 163

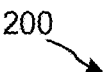

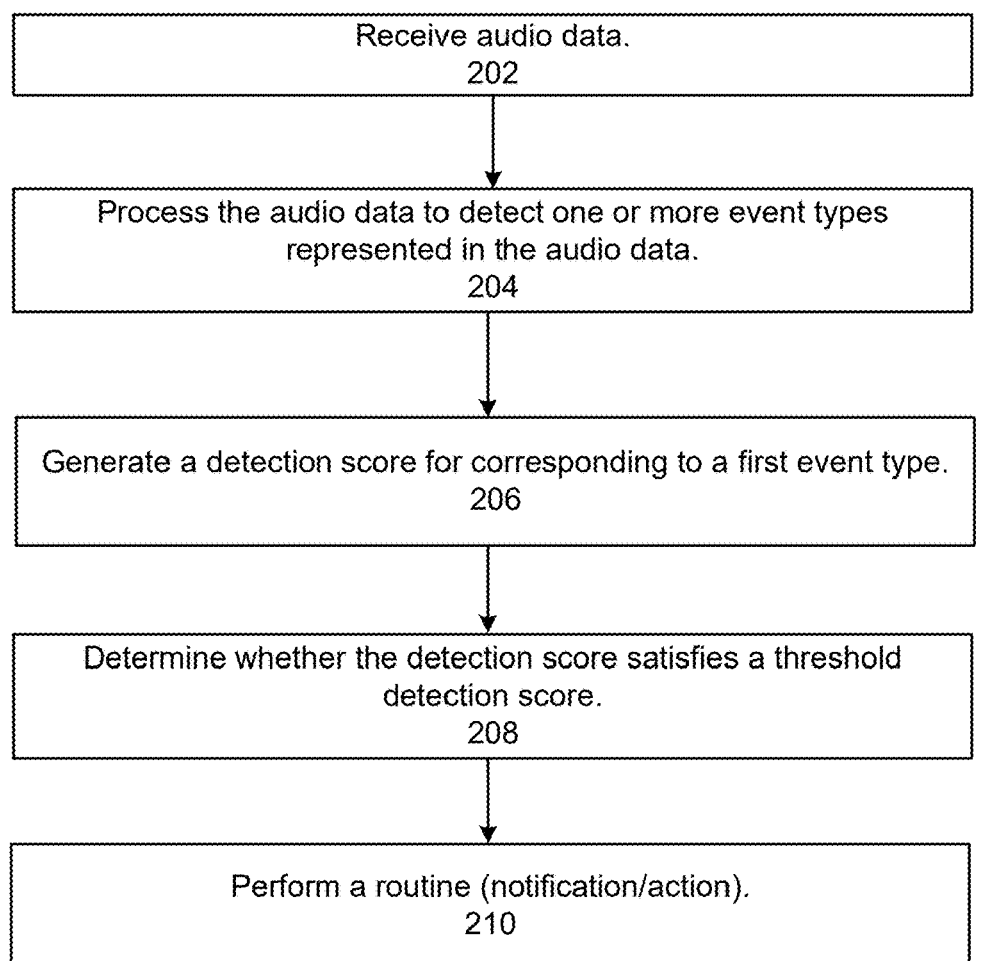

200

```
┌─────────────────────────────────────────────┐
│            Receive audio data.              │
│                   202                       │
└─────────────────────────────────────────────┘
                     │
                     ▼
┌─────────────────────────────────────────────┐
│  Process the audio data to detect one or    │
│   more event types represented in the       │
│              audio data.                    │
│                   204                       │
└─────────────────────────────────────────────┘
                     │
                     ▼
┌─────────────────────────────────────────────┐
│  Generate a detection score for             │
│  corresponding to a first event type.       │
│                   206                       │
└─────────────────────────────────────────────┘
                     │
                     ▼
┌─────────────────────────────────────────────┐
│  Determine whether the detection score      │
│      satisfies a threshold detection score. │
│                   208                       │
└─────────────────────────────────────────────┘
                     │
                     ▼
┌─────────────────────────────────────────────┐
│  Perform a routine (notification/action).   │
│                   210                       │
└─────────────────────────────────────────────┘
```

Figure 7:
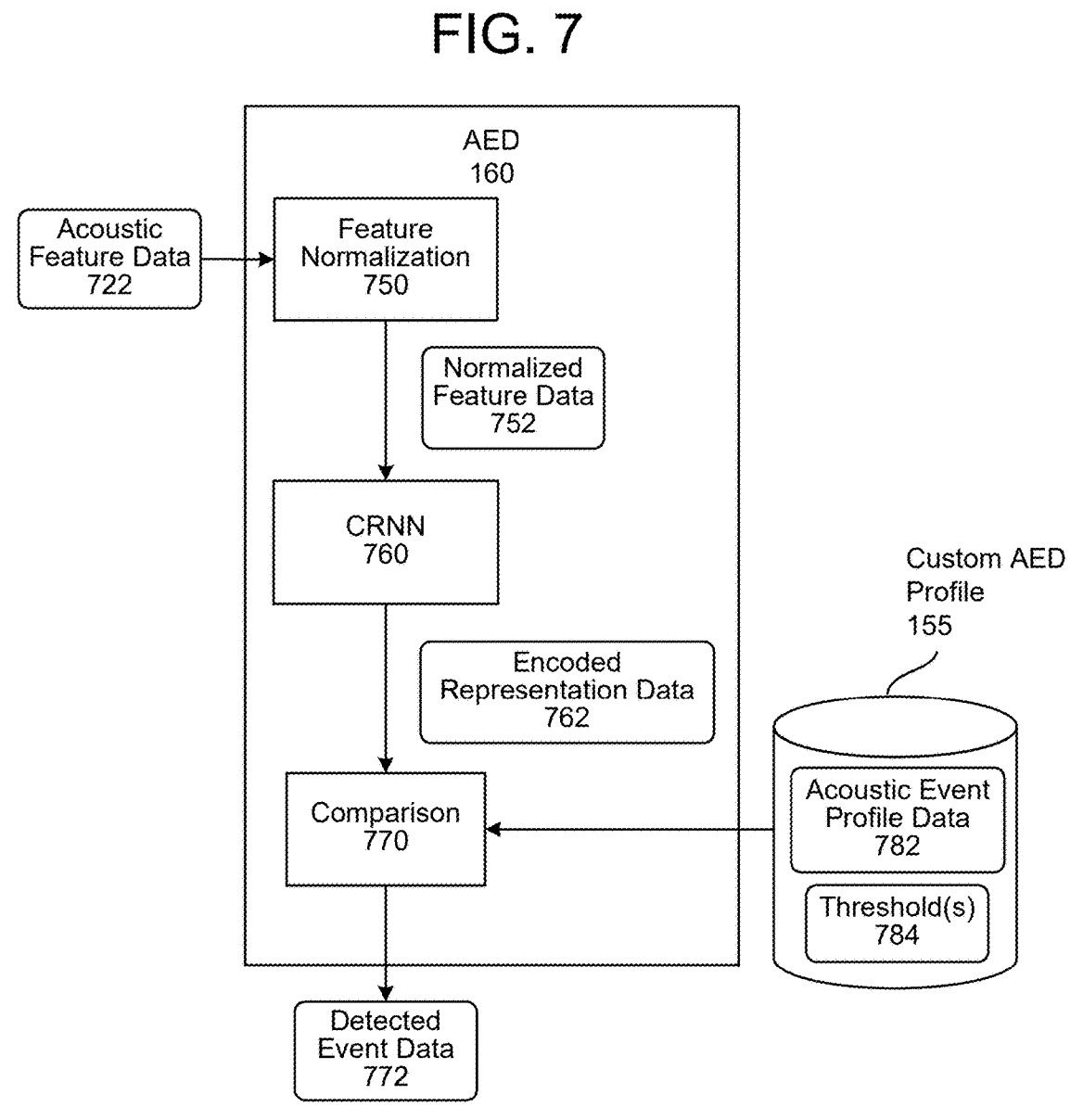

Custom AED Profile 155

Acoustic Event Profile Data 782

Threshold(s) 784

AED 160

Acoustic Feature Data 722

Feature Normalization 750

Normalized Feature Data 752

CRNN 760

Encoded Representation Data 762

Comparison 770

Detected Event Data 772

Figure 11:
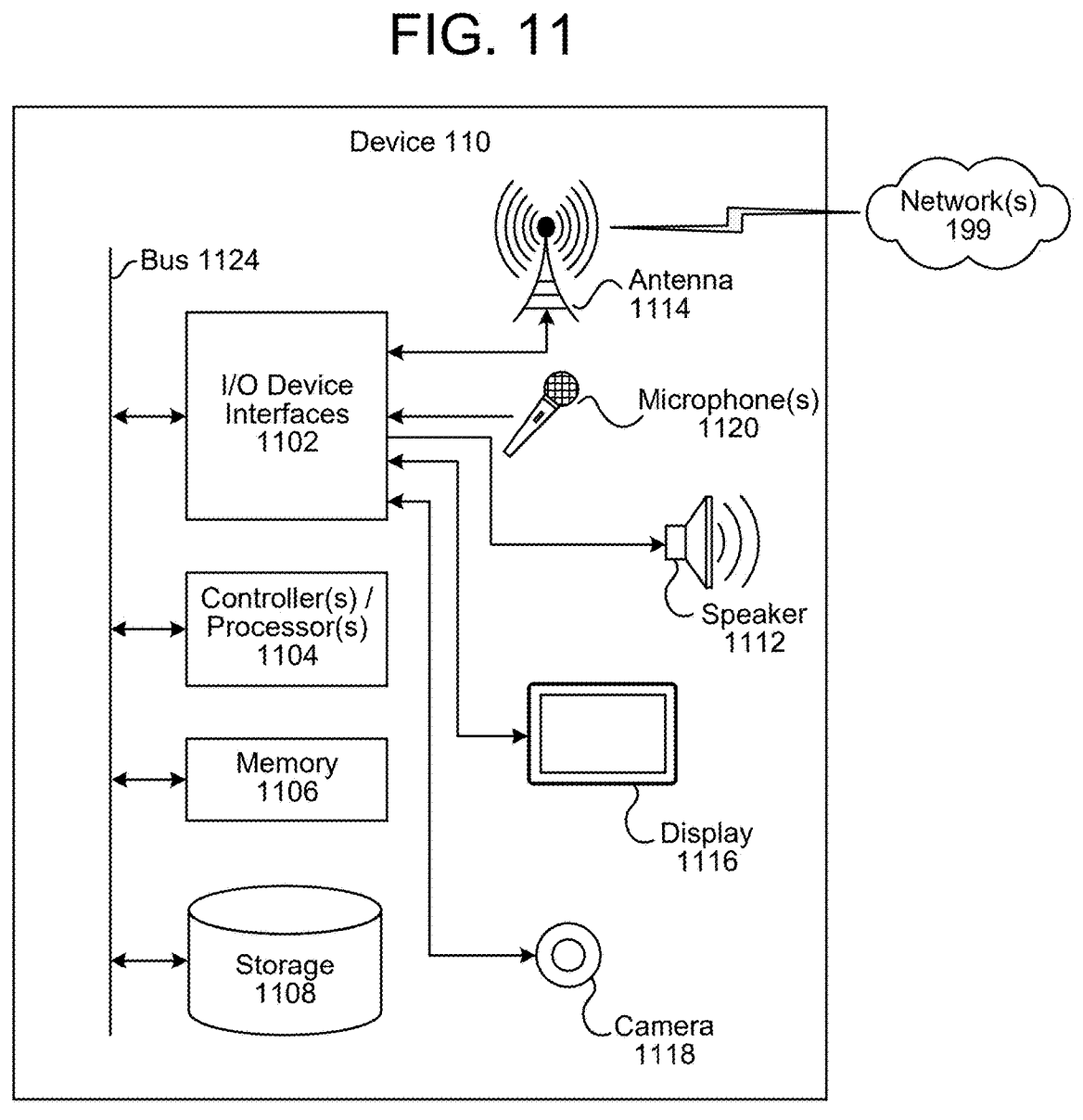

Network(s)
199

Device 110

Antenna
1114

Microphone(s)
1120

Speaker
1112

Display
1116

Camera
1118

Bus 1124

I/O Device
Interfaces
1102

Controller(s) /
Processor(s)
1104

Memory
1106

Storage
1108

FIG. 12

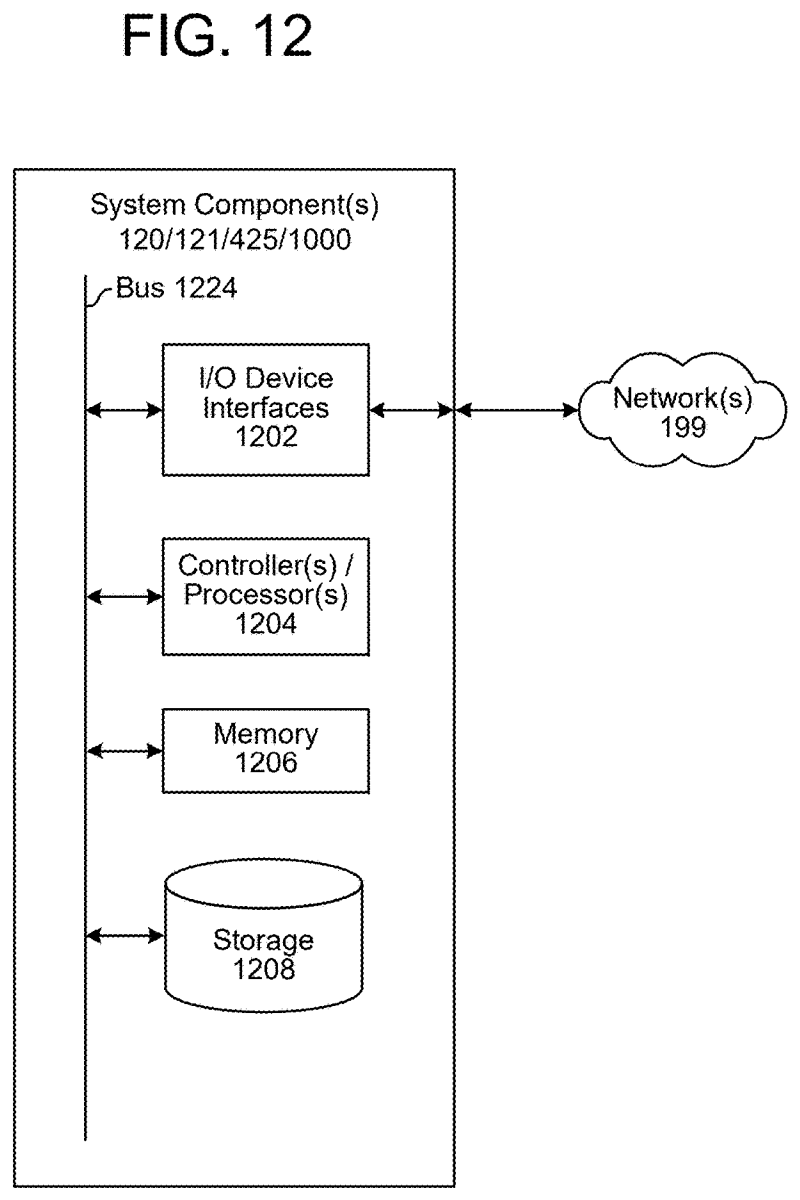

Network(s)
199

System Component(s)
120/121/425/1000

Bus 1224

I/O Device
Interfaces
1202

Controller(s) /
Processor(s)
1204

Memory
1206

Storage
1208

ACOUSTIC EVENT DETECTION

BACKGROUND

Computing devices may be configured to process sounds captured by a microphone and to take actions corresponding to the sound. The sounds may include non-speech events and/or human speech. An acoustic-event detection (AED) may be configured to recognize one or more non-speech sounds. A speech-processing system may allow a user to control computing devices using their speech. These systems identify words spoken by a user based on properties of received audio data that represents the speech of the user. Automatic speech-recognition (ASR) processing combined with natural-language understanding (NLU) processing allows a speech-processing system to determine text or other type of data corresponding to the speech and to understand an intent expressed in the speech. Acoustic-event detection and/or speech processing may be used by computers, hand-held devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a flowchart illustrating an example process to train a machine learning (ML) model to enforce mutual exclusivity to reduce occurrences of cross-triggering and false detection of event types in received audio, according to embodiments of the present disclosure.

FIG. 1C is a flowchart illustrating an example process to train a machine learning (ML) model to enforce mutual exclusivity to reduce occurrences of cross-triggering and false detection of event types in received image data, according to embodiments of the present disclosure.

FIG. 2 is a flowchart illustrating operations of an example method of detecting an event type, according to embodiments of the present disclosure.

FIG. 6 is a conceptual diagram illustrating audio graph data, text graph data, and how a correspondence between audio and text descriptions are generated, according to embodiments of the present disclosure.

FIG. 7 is a conceptual diagram illustrating components of an acoustic-event detection component, according to embodiments of the present disclosure.

FIG. 8 is a conceptual diagram illustrating a system for generating an acoustic event profile data for an acoustic event, according to embodiments of the present disclosure.

FIG. 11 is a block diagram conceptually illustrating example components of a device, according to embodiments of the present disclosure.

FIG. 12 is a block diagram conceptually illustrating example components of a system, according to embodiments of the present disclosure.

DETAILED DESCRIPTION

Figure 1B:
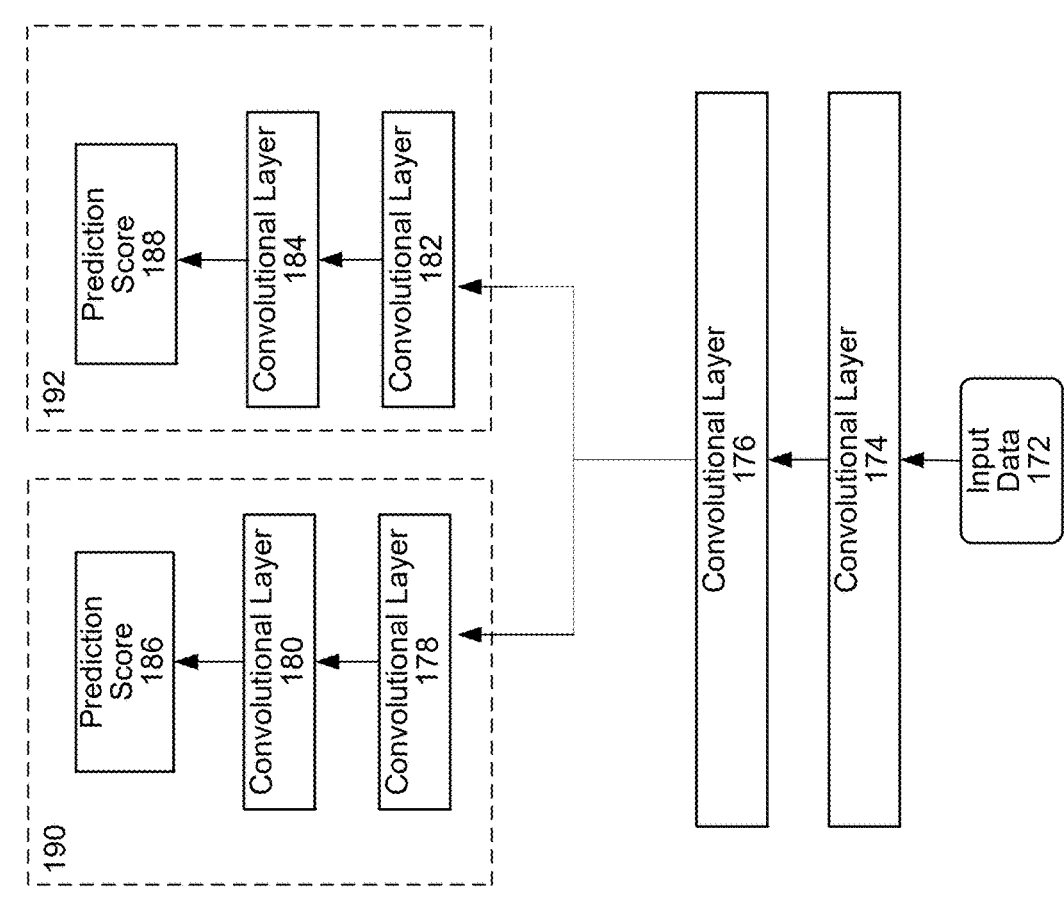
FIG. 1B illustrates an example architecture of a machine learning (ML) model, according to embodiments of the present disclosure.

Acoustic-event detection (AED) is a field of computer science and artificial intelligence that relates to processing audio data representing a sound, such as a non-speech sound, to determine when and if a particular acoustic event is represented in the audio data. Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Object detection (OD) is a field of computer science and artificial intelligence that relates to processing image data to detect whether a particular object is represented in the image data. Text-to-speech (TTS) is a field of computer science, artificial intelligence, and linguistics that relates to enabling computers to convert a representation of text into audio representing synthesized speech. ASR and/or NLU may be used together as part of a natural language processing system. In other embodiments, systems may use spoken language understanding (SLU) techniques that processes audio data representing speech and determines meaning of the speech. A system may also be capable of acoustic-event detection, that is detecting events that have one or more distinctive sounds that allow the system to determine when they occur. Examples of such events may include hand clap, door knock, glass breaking, a dog barking, or other events. A system capable of performing speech processing may also be capable of performing AED. Such a system may also be capable of performing OD for image data captured by device(s). In various embodiments, the natural language processing system may process data associated with an acoustic event (e.g., audio data that includes a representation of the event and/or event data generated by the AED system) and/or speech data associated with the event and may determine a corresponding output (e.g., sending a notification to a user device).

A device and/or a system may thus be configured to process audio data to determine if properties of the audio data correspond to properties associated with an acoustic event. Examples of acoustic events include a door knock, hand clap, doorbell ringing, a microwave oven beeping, a dog barking, a window pane breaking, and/or a door closing. The device and/or the system may process the audio data in groups of samples, such as frames of audio data, to extract audio features from the audio data as it is received. The audio features may include, for example, log Mel-filterbank energy features corresponding to the audio data frames. An AED component of the device or the system may process the audio features.

A voice-controlled device and/or a system may also be configured to receive a spoken user input and detect a wakeword and/or other text in the user input; determine a command in the user input; and provide a response to the command. A user may thus interact with the voice-controlled device, another device, and/or system by voice. In some embodiments, in response to the device detecting the wakeword, the user device may perform speech processing on audio data representing the speech of the user, and/or send the audio data to the system for processing. The system may further process the audio data to verify that it includes a representation of the wakeword and/or to determine the command and/or response. The device may then receive, from the system, output audio, video, or other data related to the response and/or other data required to perform an action associated with the response (e.g., a command to turn on a light).

An AED component may be configured to detect occurrences of one or more event types, such as, door knock, hand clap, glass breaking, fire/smoke alarm, etc. Any type of response to a voice command can also be provided in response an AED component's output data. The system may be configured to perform a routine, such as sending a notification, upon determining an acoustic event has been detected. As used herein, a routine may refer to one or more commands that may be executed by the system 100, for example in response to a detected acoustic event. For example, the system may be configured to send a notification to a user, such as to their mobile device or virtual assistant device, if an acoustic event of door knock is detected. In some instances, the user may prefer to not be notified upon detection of certain acoustic events, such as detection of a hand clap. Such actions may also be performed in response to object detection, that is recognition of an object detected by one or more cameras or image capture devices.

As can be appreciated, the system may be configured to perform a number of different actions upon detection of an acoustic event/object. Performance of a specific action may be based on system configurations/capabilities, user preferences, or the like. Examples of a specific action may include but are not limited to generating and/or determining a notification, sending a notification to a device 110 associated with a user, automated performance of one or more actions, such as powering on/off a device 110 (e.g., device 110g, device 110h, and the like), and the other similar actions.

The AED component may include a machine learning (ML) model configured to detect the one or more event types. The ML model may include various event detectors to detect the different event types. In some scenarios, audio characteristics of a first event type may be substantially similar to the audio characteristics of a second event type. In such scenarios, cross-triggering issues may arise, where the detector of the first event type and the detector of the second event type may both generate positive detection scores that are high enough to satisfy a threshold detection score such that the ML model indicates detection of both of the event types in the audio data. This may occur even if only one such event has actually occurred. Therefore, in such scenarios, accuracy of the ML model and the AED component is reduced and the user experience of a device and/or system implementing the AED component is negatively affected.

The present disclosure describes, among other things, techniques for reducing cross-triggering issues and false detections and improving accuracy of acoustic event detection. The techniques of the present disclosure are configured to train one or more ML models to enforce mutual exclusivity between two or more event types with sufficiently similar audio characteristics such that the trained ML model reduces detection score of a first event type of the two or more event types when a detection score of the second event type of the two or more even types increases. A system of the present disclosure may receive audio data and detect an event type in the audio data with improved accuracy and reduced, if any, impact from cross-triggering and false detection of event types with sufficiently similar audio characteristics.

The techniques of the present disclosure also improve user experience of a device by reducing false detection of event types in audio and/or image data and, thus, improving accuracy of detecting event types in the audio and/or image data. While certain aspects of the present disclosure may be described with regard to audio data or image data for purposes of illustration, the techniques herein may be applied to either.

Teachings of the present disclosure may be configured to incorporate user permissions and may only perform activities disclosed herein if approved by a user. These permissions may include a grant (or denial) to use a particular component/method. The systems, devices, components, and techniques described herein may thus be configured to restrict processing where appropriate and only process user information in a manner that ensures compliance with all appropriate laws, regulations, standards, and the like. The system and techniques may be implemented on a geographic basis to ensure compliance with laws in various jurisdictions and entities in which the components of the system and/or user are located.

FIG. 1A shows an example training process 101 that may be performed to train a machine learning (ML) model used by an acoustic event detection component to reduce cross-triggering and false detection by enforcing mutual exclusivity between two event types with sufficiently similar audio characteristics.

Figure 1D:
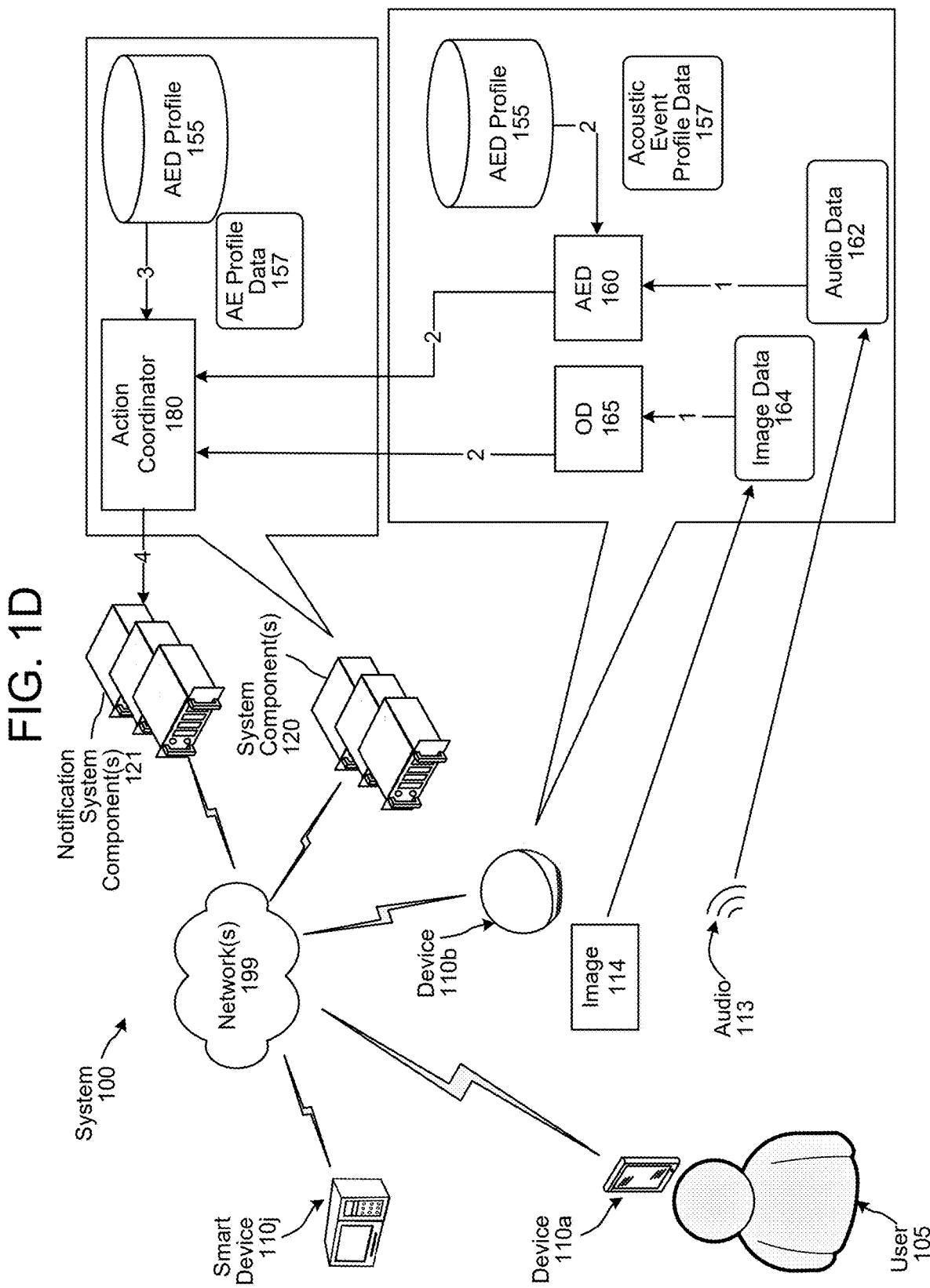
FIG. 1D illustrates a system configured to receive and process a request to detect an acoustic event, according to embodiments of the present disclosure.

As shown in FIG. 1A, the system 100 may include one or more devices 110 in communication with one or more system component(s) 120 over a network(s) 199. The system 100 may also include notification system component(s) 121 (shown in FIG. 1D) in communication with the devices 110 and/or the system component(s) 120. A device 110 may be local to a user 105 (as shown in FIG. 1D). A device 110 may be within an environment (e.g., home, office, vehicle, etc.) of the user. The network(s) 199 may include the Internet and/or any other wide- or local-area network, and may include wired, wireless, and/or cellular network hardware. Although the figures and discussion of the present disclosure illustrate certain operational steps of the system in a particular order, the steps described may be performed in a different order (as well as certain steps removed or added) without departing from the intent of the disclosure. As shown in FIG. 1A, a device 110 may include an acoustic event detection (AED) component 160. The AED component 160 may be used by the device 110 to perform AED operations such as those described later herein. The AED component 160 may include one or more ML models configured to perform AED as described herein. Such models may be configured/updated according to the processes described herein.

As shown in FIG. 1A, the system component(s) 120 may be configure to perform training/updating of an ML model to be used by the AED 160, though in some embodiments, the ML model may be trained on the device 110, which may perform the steps of training process 101.

Referring to FIG. 1A, a device 110/a system 120 may receive (130) training audio data. The training audio data may be acoustic feature data corresponding to audio from one or more events (e.g., a door knock, a hand clap, a wakeword, doorbell ringing, a microwave oven beeping, a dog barking, a window pane breaking, and/or a door closing) that may occur within an environment of some device, such as device 110. The training audio data may correspond to a length of time (e.g., 25 millisecond frames of audio). In some embodiments, the acoustic features may include log Mel-filterbank energy features corresponding to an audio frame. In some embodiments, multiple event types may be represented in the training audio data. For example, a hand clap event type and a baby crying event type may be represented in a single instance of training audio data. The training data may be associated with ground truth audio data. The device 110/the system 120 may train the ML model using the ground truth audio data. For the purpose of illustrating an example of the training process, the received training audio data will be referred to herein using variable x, and the ground truth data will be referred to herein using variable y. The ground truth data associated with the audio data may represent which event types are known to be represented in the particular sample of audio data. In some embodiments, the ground truth data y may be a multi-hot encoding vector of size K, where K is the set of event types (e.g., K={1, 2, . . . , K} event types) that are desired to be detected by the ML model. Each training audio data x may be associated with a set of positive labels (P) identifying event types represented in the training audio data x and a set of negative (N) labels identifying event types not represented in the training audio data x. Each event type in the set of K event types may be associated with a positive-negative label pair or set from the set of positive (P) and negative (N) labels, such that the set of K event types=P∪N and P∩N=0. These pairs or sets of event types may be used to train the model to more accurately distinguish between events within each pair or set, as described below.

The ML model may be embodied within a neural network (e.g., convolution neural network (CNN), deep neural network (DNN), recurrent neural network (RNN), and the like). The ML model may include various event detectors for different event types desired to be detected by the ML model. For example, as described above, it may be desired for the ML model to detect a set of K={1, 2, . . . , K} event types, and the ML model may include a detector for each event type of the set of K event types. An example architecture of the ML model embodied within a CNN is shown in FIG. 1B. Referring to FIG. 1B, the example architecture of the ML model may include one or more convolution layers, such as convolution layers 174, 176, where input data 172 may be the received training audio data at step 102. In FIG. 1B, the set of K event types desired to be detected by the ML model may be set to two, and, as shown in FIG. 1B, the ML model may include two event detectors 190, 192, where event detector 190 is for a first event type (e.g., hand clap event type) and event detector 192 is for a second event type (e.g., door knock event type). Similarly, as can be appreciated, the ML model may include K event detectors, one event detector for each event type in the set of K event types.

The ultimate event detectors may share the convolutional layers 174, 176. Each of the convolutional layers 174, 176 may produce feature maps. After the convolutional layers, the architecture of the ML model may split into separate branches for the different event detectors 190, 192 of the ML model to learn event-specific features for classification. Each branch of the ML model may further include additional convolutional layers, for example, convolution layers 178, 182 for the branch of event detector 190 and convolution layers 194, 196 for the branch of event detector 192, as shown in FIG. 1B. In some embodiments, the architecture of the ML model may include a normalization (e.g., batch normalization) layer (not shown separately) and an activation (e.g., ReLU activation) layer (e.g., not shown separately). The architecture of the ML model may further include an additional layer whose activation function may be a sigmoid function used for classification purpose (not show separately). Each of event detectors 190, 192 may include an output layer such as the prediction score layers 184, 198, respectively, to output a detection score corresponding to the event type.

Referring back to FIG. 1A, an initial ML model to be updated may be capable of a certain level of AED performance with regard to detection of a predetermined set of event types (e.g., events that the model may be used to predict). That initial performance, which may not necessarily result in sufficiently distinct AED scores, may be improved by the training discussed herein. The initial performance may be measured by the device 110/the system 120 processing the received training audio data using the event detectors of the initial ML model to determine whether a corresponding event type is represented in the training audio data. This initial processing may generate an initial positive detection score corresponding to an event type if the corresponding event detector using the initial ML model determines the event type is represented in the training audio. For example, if the training audio includes a representation of acoustic characteristics of a hand clap event type and a baby crying event type, then the event type detector of hand clap event type may generate one detection score and the event type detector of a baby crying event type may generate another detection score. Additionally, event detectors for event types that have similar acoustic characteristics as a hand clap event type or a baby crying event type may also generate their own respective initial detection score. Those scores may be used later to compare the relative performance of the initial model to an updated model.

To perform the training/updating, the device 110/system 120 may determine (132) a first subset of event types (from the predetermined set of event types, e.g., the K set of event types) that are actually represented in a particular instance of the training audio data. That is, the device 110/system 120 may figure out, from the ground truth data, which actual event(s) are in a particular segment of audio data. So during the training process, the device 110/the system 120 may use the ground truth data y and the set of positive labels P associated with the training audio data x to train the ML model to determine the set of event types represented in the training audio data x. For the event types represented in the training audio data x, the ML model may be trained to associate their corresponding initial detection scores as detection scores of event types represented in the audio data x.

The device 110/the system 120 may also determine (134) a second subset of event types (from the predetermined set of event types) that are not represented in the training audio data x. The device 110/the system 120 may use the ground truth data y and the set of negative labels N associated with the training audio data x to train the ML model to determine the second subset of event types that not represented in the training audio data x. For example, if a set of negative labels associated with training audio data x indicates that a door knock event type, a pet whining event type, and an appliance beeping event type are not represented in the audio data x, then the ML model may determine that the foregoing event types are not represented in the training audio data x, and may associate their corresponding initial detection scores as detection scores of event types not represented in the training audio data x.

The device 110/system 120 may then determine pairs or sets of event types according to whether they are, or are not, represented in the particular training audio segment. For example, if a particular audio segment includes two event types that are represented, such as event types {A, B} and three event types that are not represented such as event types {1, 2, 3} the system may determine six different pairs or sets of detected/not detected events, namely pairs or sets {A, 1}, {A, 2}, {A, 3}, {B, 1}, {B, 2}, and {B, 3}.

The device 110/the system 120 may determine a regularizer (136) to enforce mutual exclusivity between these pairs or sets of event types. The mutual exclusivity between any positive-negative label pair or set may be expressed as a Boolean function using disjunction of conjunctions:

$$f(y) = \bigvee_{j \in P} \left( \bigwedge_{k \in N} \neg y_k \wedge y_j \right), \tag{1}$$

The function $f$ of equation (1) may be approximated with a differentiable function to optimize equation (1) with gradient descent by replacing $\bigvee$ with $\Sigma$ and $\bigwedge$ with $\Pi$, and approximate the Boolean operation $\neg y_k$ by $1-y_k$. The output binary vector y of the ML model may be replaced with $\hat{y} = F_\Phi(x)$, where the elements of y may be continuous values between 0 and 1, and where $F_\Phi$ is the ML model and the various parameters of the ML model denoted as $\Phi$. Accordingly, equation (1) can be rewritten as $$f(y \mid x, \Phi) \approx -\sum_{j \in P} \left( \prod_{k \in N} \hat{y}_j (1 - \hat{y}_k) \right), \tag{2}$$

$$\approx -\sum_{j \in P} \left( \hat{y}_j \prod_{k \in N} (1 - \hat{y}_k) \right), \tag{3}$$

The terms on the right-hand side of the equation (3) define the regularizer $\mathcal{R}_{me}$ that may be optimized to enforce mutual exclusivity between any positive-negative event type pairs or sets. In equation (3), $\hat{y}_j$ represents a detection score for a j event type, where the j event type is an event type represented in the received training audio data x, and P is the set of positive labels associated with the training audio data x, where each label in P indicates an event type represented in the training audio data x. For example, if a hand clap event type and a baby crying event type are represented in the training audio data x, then P includes a label identifying hand clap event type and another label for baby crying event type. In such a scenario, in equation (3) P may be of size 2, where j=0 may correspond to the hand clap event type and j=4 may correspond to the baby crying event type, and $\hat{y}_0$ is the detection score for the hand clap event type and $\hat{y}_4$ may be the detection score for the baby crying event type. Similarly, if a door knock event type and a pet whining event type are not represented in the audio data x, then N includes a label identifying door knock event type and another label identifying pet whining event type. In such a scenario, in equation (3) N may be of size 2, where k=1 may correspond to the door knock event type and k=3 may correspond to the pet whining event type, and 91 may be the detection score for the door knock event type and $\hat{y}_2$ may be the detection score for the pet whining event type. Then, as shown in equation (3), then for j=0 (the hand clap event type), the regularizer $\mathcal{R}_{me}$ may reduce the detection score corresponding to each event type k not represented in the audio data x, therefore for k=1 and k=2, $\hat{y}_1$ and $\hat{y}_2$. Similarly, for j=4 (baby crying event type), the regularizer $\mathcal{R}_{me}$ may reduce the detection score corresponding to each event type k not represented in the audio data x, therefore for k=1 and k=2, $\hat{y}_1$ and $\hat{y}_2$.

By using the regularizer $\mathcal{R}_{me}$ of equation (3), the ML model is trained to decrease every initial detection score associated with event types not represented (k∈ N, the set of negative labels N) in the received training audio data for every event type represented (j∈ P the set of positive labels P). To illustrate with an example described above where a hand clap event type and a baby crying event type are represented in the received training audio data, and a door knock event type and a pet whining event type are not represented, the ML model using the regularizer $\mathcal{R}_{me}$ may decrease the initial detection scores corresponding to the door knock event type and the pet whining event type.

In examples where a single positive label is associated with input x, such that |P|=1 and |N|=K−1, the regularizer $\mathcal{R}_{me}$ may be reduced to enforce exclusivity on audio data that includes representation of a single event type only.

In determining the regularizer $\mathcal{R}_{me}$, the device 110/the system 120 may further optimize the equation (3) of the regularizer $\mathcal{R}_{me}$ as following:

$$\mathcal{R}_{me} = -\sum_{j \in P} \left( \hat{y}_j \sum_{k \in N} \log(1 - \hat{y}_k) \right), \tag{4}$$

$$= -\sum_{j \in P} \sum_{k \in N} \hat{y}_j \log(1 - \hat{y}_k)), \tag{5}$$

In determining the regularizer $\mathcal{R}_{me}$ of equations (3) and (5), the device 110/the system 120 may set a corresponding element of output vector $\hat{y}_j$ to a value of 1 for every positive label in the set of positive labels P, where the corresponding element is associated with an event type from the set of K event types, and may set a corresponding element of the output vector $\hat{y}_j$ to a value of 0 for every negative label in the set of negative labels N for an event type. For example, the output vector $\hat{y}_j=1$, $\forall_j \in P$ and $\hat{y}=0$, $\forall_k \in N$.

In some embodiments, the device 110/the system 120 may implement the regularizer by computing two outer products $Y_\otimes$ and $\hat{Y}_\otimes$:

$$Y_\otimes = y(1-y)^T, \tag{6}$$

$$\hat{Y}_\otimes = \hat{y} \log(1-\hat{y})^T, \tag{7}$$

where y is a ground-truth multi-hot encoding vector y∈ {0, 1}$^K$ and $\hat{y} \in$ {0, 1}$^K$ of input x, and 1 denotes a vector where all elements are 1s. $\hat{Y}_\otimes$ reflects computation of the regularizer $\mathcal{R}_{me}$ in (5) and $Y_\otimes$ is used as a masking matrix, where $y_\otimes(j, k)=0$ if two different event types or event classes j and k are represented in the input x, and $y_\otimes(j, k)=1$ otherwise. The regularizer $\mathcal{R}_{me}$ may be computed by element-wise product of $Y_\otimes$ and $\hat{Y}_\otimes$ and taking a sum of the resulting matrix, as following:

$$\mathcal{R} = 1(Y_\otimes \odot \hat{Y}_\otimes)1^T, \tag{8}$$

The regularizer $\mathcal{R}_{me}$ may be included as part of the loss function of the ML model and/or may be weighed by a weight parameter λ. In some embodiments, the λ parameter may increase or decrease the effect of the regularizer $\mathcal{R}_{me}$ on output of one or more ML models.

The device 110/the system 120 may determine a weight parameter λ (138) for the regularizer for the pairs or sets of event types where one element of the pair or set is represented in the training audio data segment and another element of the pair or set is not represented in the training audio data segment. In some embodiments, the weight parameter λ may be predetermined and/or user defined for all different pairs or sets of event types represented and event types not represented in the training audio. For example, the weight parameter λ may be predetermined and/or user defined to a value of 0.5 for all the different pairs or sets. In some embodiments, different weight parameter λ values may be determined, predetermined, and/or defined based on similarity between the audio characteristics of the event types a pair or a set of event types.

For example, in some embodiments, one or more pairs or sets of event types may be predetermined to have a sufficiently similar audio characteristics, and a weight parameter may be selected for such pair(s) or set(s). This selected parameter value may be used to further distinguish the two events (e.g., with similar audio characteristics) during AED processing to avoid having a positive instance of one such event to accidentally result in detection of the other (similar sounding) event. For example, it may be determined that a hand clap event type and a door knock event type have sufficiently similar audio characteristics (for example by comparing an acoustic profile of one to an acoustic profile of another and having the results indicate a sufficient similarity. In another example, graph data (such as that described below in reference to FIG. 6) may be used to determine whether certain sounds are sufficiently similar).

Event types that have a high similarity may also have a high weight parameter value. Thus a value of 8 for the weight parameter λ may be associated with such a pair or a set of event types, and the device 110/the system 120 may train the ML model to set 8 for the weight parameter λ when enforcing mutual exclusivity between the hand clap event type and the door knock event type. Similarly for pairs or sets of event types that may not have sufficiently similar audio characteristics, the value of the weight parameter λ may be determined to be a low value such as 0 or a 0.1, and the like. Thus, a greater weight parameter λ may be selected for events that sound similar.

The device 110/the system 120, for each pair or set of event types represented in the training audio data and event type not represented in the training audio data, may train (140) the ML model to reduce a detection score associated with the event type not represented in the training audio data. As described above, the ML model may be configured with a loss function that includes the regularizer $\mathcal{R}_{me}$ and a weight parameter λ. An example of the loss function including the regularizer $\mathcal{R}_{me}$ and a weight parameter λ is as following:

$$\mathcal{L} = BCE(y, \hat{y}) + \lambda \mathcal{R}_{me}(y, \hat{y}), \quad (9)$$

where the weight parameter λ also allows for a trade-off between a binary cross-entropy loss (BCE) and the mutual exclusivity regularizer $\mathcal{R}_{me}$. In some embodiments, the BCE loss may be optimized to penalize false positives and false negatives differently, for example, the BCE to be optimized according to the following:

$$BCE(y, \hat{y}) = \sum_k (\beta_{FP} y_k \log \hat{y}_k + \beta_{FN}(1 - y_k) \log(1 - \hat{y}_k)), \quad (10)$$

where $\beta_{FP}$ and $\beta_{FN}$ are the penalizing weights for false positives and false negatives, respectively.

The device 110/the system 120 may train the ML model to minimize the loss function depicted in equation (9). Due to regularizer $\mathcal{R}_{me}$, determined as described above and included in the loss function, the resulting trained ML model may be configured to enforce mutual exclusivity between pairs or sets of event types that are determined to be represented in audio data and event types that are determined to be not represented in the audio data. Thus, using the trained ML model for acoustic event detection can reduce the occurrence of cross-triggering and false detection for event types with audio characteristics that are sufficiently similar. Additionally, using the trained ML model also improves accuracy of acoustic event detection and further improves user experience of a device (e.g., device 110a) or a system (120) comprising an acoustic detection component that implements such a trained ML model. The device 110/system 120 may continue the process described herein across many different training audio data samples to arrive a trained/updated ML model that may be used for acoustic event detection, for example an updated AED model 161 shown in FIG. 1A.

The device 110/the system 120 may send the updated AED model 161 to a device (such as device 110 or another device). The receiving devices (e.g., another device 110/system 120) of the updated AED model 161 may implement the updated AED model 161. For example, a device may incorporate the updated AED model 161 into its AED component 160. The receiving devices (e.g., device 110 may process received audio data and determine presence of one or more types acoustic events using the updated AED model 161. Additional details of using the updated AED model 161 are described below with respect to FIG. 1D.

In some embodiments, the device 110/the system 120 may receive training audio data representing a segment of audio. The device 110/the system 120 may generate, using a first ML model, a first score corresponding to a first acoustic event and a second score corresponding to a second acoustic event. The device 110/the system 120 may determine, using ground truth data associated with the training audio data, that the first acoustic event is represented in the training audio data. The device 110/the system 120 may determine, using the ground truth data associated with the training audio data, that the second acoustic event is not represented in the training audio data. The device 110/the system 120 may determine a regularizer function to enforce mutual exclusivity between the first acoustic event and the second acoustic event. The device 110/the system 120 may determine first audio characteristic data corresponding to the first acoustic event is similar to second audio characteristic data corresponding to the second acoustic event. The device 110/the system 120 may determine, based at least in part on a similarity between the first audio characteristic data and the second audio characteristic data, a first weight parameter corresponding to a first pair or a first set of event types comprising the first acoustic event and the second acoustic event. The device 110/the system 120 may perform at least one training iteration using the first ML model, the training audio data, the regularizer function, and the first weight parameter, to determine an updated first ML model configured to determine, for the second acoustic event, an updated second score lower than the second score.

FIG. 1C shows an example training process 141 that may be performed to train a machine learning (ML) model used by an object detection component to reduce cross-triggering and false detection by enforcing mutual exclusivity between two event types with sufficiently similar image characteristics.

The device 110 may be include an object detection (OD) component 165, as shown in FIG. 1C. The OD component 165 may be used by the device 110 to perform OD operations such as those described later herein. The OD component 165 may include one or more ML models configured to perform OD as described herein. Such models may be configured/updated according to the processes described herein.

In some embodiments, as shown in FIG. 1C, the system component(s) 120 may be configured to perform training/updating of an ML model to be used by the OD 165 by performing the steps of training process 141. In some embodiments, the ML model may be trained/updated on the device 110, which may perform the steps of the training process 141. For the purpose of illustrating an example for the different embodiments, the steps of the training process 141 will be described as being performed by the device 110/the system 120. In some embodiments, the same ML model trained/updated to be used by the AED 160, as described above, may be trained/updated to be used by the OD 165 component. In other embodiments an OD model may be different from an AED model.

Referring to FIG. 1C, the device 110/the system 120 may receive (142) training image data. The training image data may correspond to images representing one or more image events of interest, such as presence of one or more inanimate objects, presence of one or more gestures, presence of one or more humans, presence of one or more gestures by one or more humans, presence of one or more animals, and the like, that may occur in an environment of some device, such as device 110. In some embodiments, each of the events may correspond to a different event type. For example, presence of a teapot may be a first event type, presence of a coffee pot may be a second event type, presence of a basketball may be third event type, presence of a soccer ball may be a fourth event type, presence of a hand gesture may be a fifth event type, presence of a different hand gesture may be a sixth event type, presence of a hand gesture by a first human may be a seventh event type, presence of a hand gesture by a second human may be an eighth event type, presence of a second human as ninth event type, etc. The training image data may correspond to an image, an image frame, an image frame from a sequence and/or a set of image frames, and the like. For example, an instance of a training image data may correspond to an image frame. In some embodiments, multiple image event types may be represented in the image data. For example, a first object (e.g., teapot) event type, and a first hand gesture event type) may be represented in a single instance of the training image data.

The training image data may be associated with ground truth image data. The device 110/the system 120 may train the ML model using the ground truth image data. Similar to the example for the training process of audio event detection described above, for the purpose of illustrating an example of the training process for object detection, the received training image data will be referred to herein using variable x, and the ground truth data will be referred to herein using variable y. In some embodiments, the ground truth data y may be a multi-hot encoding vector of size K, where K is the set of object types (e.g., $K=\{1, 2, \ldots, K\}$ object types), such as the object types describe above, that are desired to be detected by the ML model. Each training image data x may be associated with a set of positive labels (P) identifying object types represented in the training image data x and a set of negative (N) labels identifying object types not represented in the training image data x. Each object type in the set of K object types may be associated with a positive-negative label pair or set from the set of positive (P) and negative (N) labels, such that the set of K event types=PUN and P∩N=0. These pairs or sets of object types may be used to train the model to more accurately distinguish between events within each pair or set, as described below.

Similar to the ML model trained/updated in FIG. 1A, the ML model to be used by the OD component 165 may be embodied within a neural network (e.g., convolution neural network (CNN), deep neural network (DNN), recurrent neural network (RNN), and the like). The architecture of the ML model described herein with respect to FIG. 1C may be similar to the architecture of the ML model described in FIGS. 1A and 1B. For example, the architecture of the ML model may include one or more convolution layers, similar to the convolution layers 174, 176, where input data (e.g., training image data) is received at step 141. Similarly, the ML model may include object detectors for different object types desired to be detected by the ML model. For example, the ML model may include K object detectors, one event detector for each object type of the set of K object types described above. In some embodiments, the K event detectors may have a similar architecture as event detectors 190, 192. In some embodiments, the object detectors may share the convolutional layers of the ML model and each of the convolutional layers may produce feature maps. Similar to the architecture shown in FIG. 1B, the architecture of the ML model of FIG. 1C may split into separate branches for the different object detectors, and each object detector may be configured to learn object-specific features for classification. Each branch of the ML model may further include additional convolutional layers, for example, convolution layers similar to the convolution layers for the branch of event detector 190 or 192 described above and as shown in FIG. 1B. In some embodiments, the architecture of the ML model may include a normalization (e.g., batch normalization) layer (not shown separately) and an activation (e.g., ReLU activation) layer (e.g., not shown separately). The architecture of the ML model may further include an additional layer whose activation function may be a sigmoid function used for classification purpose (not show separately). Each of object detectors of the ML model of FIG. 1C may include an output layer such as the prediction score layers, for example similar to the prediction score layers 184 or 198 shown in FIG. 1B, to output a detection score corresponding to the object type.

Similar to the initial ML model described above with respect to FIG. 1A, an initial ML model of FIG. 1C to be trained/updated may be capable of a certain level of OD performance with regard to detection of a predetermined set of object types (e.g., events that the model may be used to predict), which may not necessarily result in sufficiently distinct OD scores, but that initial performance, may be improved by the training discussed herein. The initial performance may be measured by the device 110/the system 120 processing the received training image data using the object detectors of the initial ML model to determine whether a corresponding object type is represented in the training image data. This initial processing may generate an initial positive detection score corresponding to an object type if the corresponding object detector using the initial ML model determines the event type is represented in the training image. For example, if the training image data includes a representation of an object type comprising a teapot, and an object type comprising a soccer ball, then the object type detector of a teapot event type may generate one positive detection score and the object type detector of a soccer ball event type may generate another detection score. Additionally, event detectors for event types that have similar visual characteristics as a teapot (or teapot event type) or a soccer ball (or a soccer ball event type) may also generate their own respective initial positive detection scores. Those scores may be used later to compare the relative performance of the initial model to a trained/an updated model.

The device 110/the system 120 may perform the training of the ML model to be used by an OD component, such as the OD component 165, by determining (144) a first subset of event types (from the predetermined set of event types, e.g., the K set of event types) that are actually represented in a particular instance of the training image data x. That is, the device 110/system 120 may train the ML model to determine which actual object type(s) are in the training image data. For example, during the training process, the device 110/the system 120 may use the ground truth data y and the set of positive labels P associated with the training image data x to train the ML model to determine the set of object types represented in the training image data x. For the object types represented in the training image data x, the ML model may be trained to associate their corresponding initial detection scores as detection scores of object types represented in the training image data x.

The device 110/the system 120 may determine (146) a second subset of object types (from the predetermined set of event K types) that are not represented in the training image data. That is, the device 110/system 120 may train the ML model to determine which object type(s) are not in the training image data. For example, during the training process, the device 110/the system 120 may use the ground truth data y and the set of negative labels N associated with the training image data x to train the ML model to determine the set of object types not represented in the training image data x. For the object types not represented in the training image data x, the ML model may be trained to associate their corresponding initial detection scores as detection scores of object types not represented in the training image data x.

Similar to the determining the pairs or sets of event types described herein with respect to FIG. 1A, the device 110/ system 120 may determine pairs or sets of object types according to whether they are, or are not, represented in the particular training image data. For example, if a particular training image data includes two object types that are represented, such as object types {X, Z} and three object types that are not represented such as object types {M, C, L} the system may determine six different pairs or sets of detected/not detected events, namely pairs or sets {X, M}, {X, C}, {X, L}, {Z, M}, {Z, C}, and {Z, L}. The device 110/the system 120 may determine a regularizer (148) to enforce mutual exclusivity between these pairs or sets of event types. The regularizer may be determined to enforce mutual exclusivity between the pairs or sets of image according to the equations (1)-(7), where, as described above with respect to FIG. 1C, x is training image data, y is the ground truth data associated with the training image data x, P is the set of positive labels associated with the training image data x and indicates different object type(s) represented in the training image data x, and N is the set of negative labels associated with training image data x and indicates different object type(s) not represented in the training data x.

The device 110/the system 120 may determine (150) a weight parameter for the regularizer for the pairs or sets of object types where one element of the pair or set (e.g., teapot event type) is represented in the training image data instance and another element of the pair or set is not represented (e.g., coffee pot event type represented in the training image data) in the training image data instance. In some embodiments, the weight parameter $\lambda$ may be predetermined and/or user defined for all different pairs or sets of object types represented and object types not represented in the training image data. For example, the weight parameter $\lambda$ may be predetermined and/or user defined to a value of 0.5 for all the different pairs or sets. In some embodiments, different weight parameter $\lambda$ values may be determined, predetermined, and/or defined based on similarity between the visual characteristics of the object types of a pair or set of object types.

For example, in some embodiments, one or more pairs or sets of object types may be predetermined to have a sufficiently similar visual characteristics, and a weight parameter may be selected for such pair(s) or set(s). This selected parameter value may be used to further distinguish the two objects (e.g., with similar visual characteristics) during OD processing to avoid having a positive instance of one such object type in an image data to accidentally result in detection of the other (visually similar) object type. For example, it may be determined that a teapot event type and a coffee pot event type have sufficiently similar visual characteristics (for example by comparing a visual characteristic profile of one to a visual characteristic profile of another and having the results indicate a sufficient similarity).

Object types that have a high visual similarity may also have a high weight parameter value. For example, if teapot and coffee pot have high visual similarity, then a value of 8 for the weight parameter $\lambda$ may be associated for a pair or set of event type comprising teapot event type and coffee pot event type, and the device 110/the system 120 may train the ML model to set 8 for the weight parameter $\lambda$ when enforcing mutual exclusivity between the teapot object type and the coffee pot object type. Similarly, the value of the weight parameter $\lambda$ may be determined to be a low value such as 0 or a 0.1, and the like, for pairs or sets of object types that may not have sufficiently similar visual characteristics.

The regularizer determined in (148), also denoted by $\mathcal{R}_{me}$, and the weight parameter determined in (150), also denoted by $\lambda$, may included as part of the loss function of the ML model, where the regularizer $\mathcal{R}_{me}$ may be weighed by the weight parameter $\lambda$. In some embodiments, as described above with respect to FIG. 1A, the weight parameter $\lambda$ (determined in (150)) may increase or decrease the effect of the regularizer $\mathcal{R}_{me}$ (determined in (148)) on the output of the ML model described herein with respect to FIG. 1C.

The device 110/the system 120, for each pair or set of object type represented in the training image data and object type not represented in the training image data, may train (140) the ML model to reduce a detection score associated with the object type not represented in the training image data. The ML model of FIG. 1C may be configured with a loss function as the loss function shown in equation (9), where, as described above, the regularizer $\mathcal{R}_{me}$ is the regularizer determined in (148) and the weight parameter $\lambda$ is the weight parameter determined in (150). In some embodiments, the BCE loss of equation (9) may be optimized to penalize false positive detection of object types and false negative detection of object types differently, where $\beta_{FP}$ and $\beta_{FN}$ are the penalizing weights for false detection of object types and false negative detection of object types, respectively.

The device 110/the system 120 may train the ML model to minimize the loss function depicted in equation (9). Due to regularizer $\mathcal{R}_{me}$, determined in (148) as described above and included in the loss function, the resulting trained ML model may be configured to enforce mutual exclusivity between pairs or sets of object types that are determined to be represented in image data and object types that are determined to be not represented in the image data. Thus, using the trained ML model for object detection can reduce the occurrence of cross-triggering and false detection for object types with visual characteristics that are sufficiently similar (e.g., a visual similarity score that satisfies a threshold visual similarity). Additionally, using the trained ML model also improves accuracy of object detection and further improves user experience of a device (e.g., device 110*a*) or a system (120) comprising an object detection component that implements a trained ML model as described in FIG. 1C. The device 110/system 120 may continue the process described herein across many different training image data samples to arrive at a trained/updated ML model that may be used for object detection, for example an updated OD model 163 shown in FIG. 1C.

The device 110/the system 120 may send the updated OD model 163 to a device (such as device 110 or another device). The receiving devices (e.g., another device 110/system 120) of the updated OD model 163 may implement the updated OD model 163. For example, a device may incorporate the updated OD model 163 into its OD component 165. The receiving devices (e.g., device 110) may process received image data and determine presence of one or more object types in the image data using the updated OD model 163. Additional details of using the updated OD model 163 are described below with respect to FIG. 1D.

Figure 4:
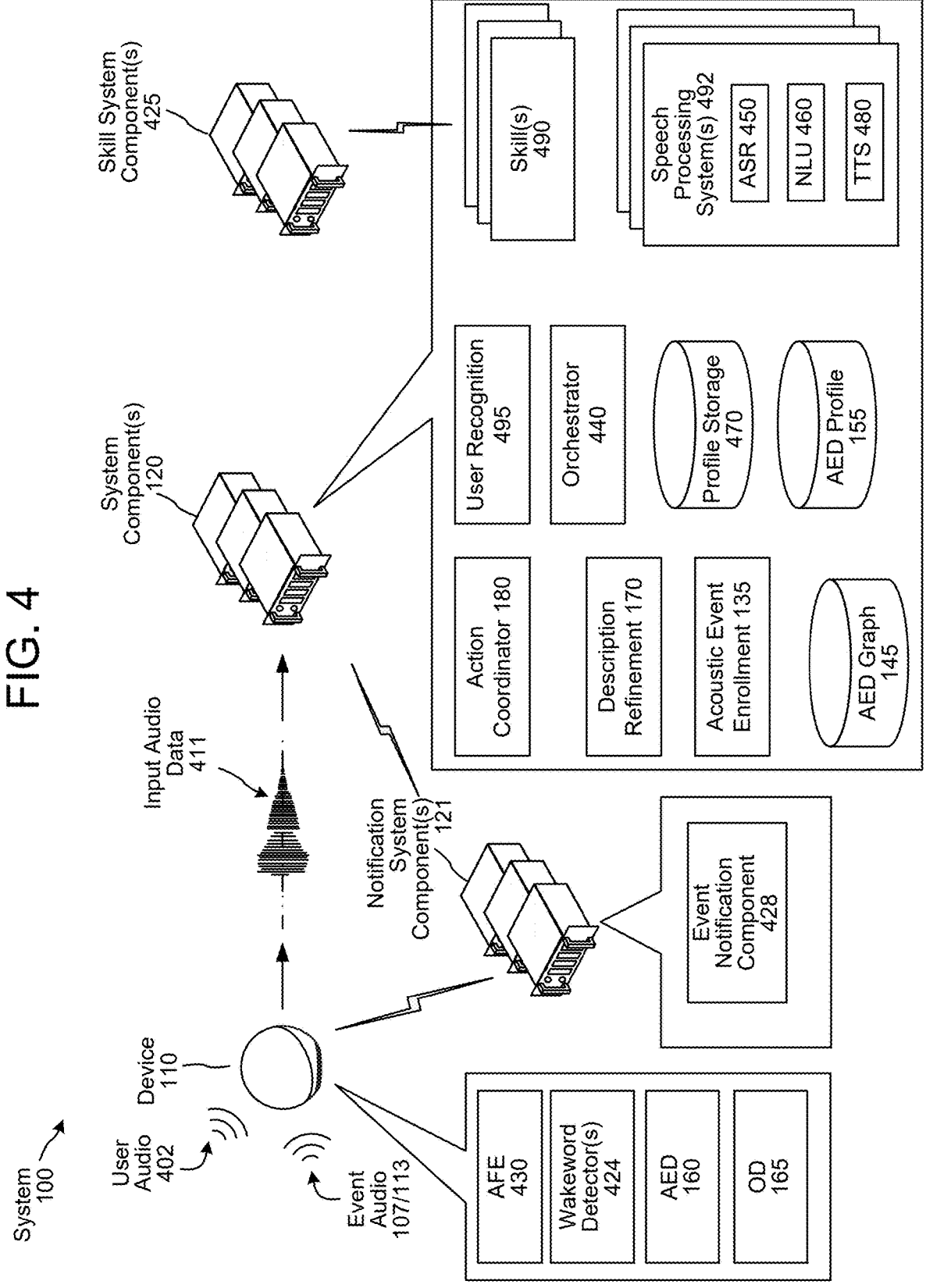
FIG. 4 is conceptual diagram illustrating a device, a system configured for detecting an acoustic event, and a system for speech processing, according to embodiments of the present disclosure.

Referring to FIG. 1D, the device 110*b* may include an AED component 160 configured to detect one or more event types represented in input audio data. In some embodiments, the system component(s) 120 may include an AED component 160 configured to detect one or more event types, as shown in FIG. 4. The AED component 160 may include the updated AED model 161 as described above, which may be configured to more robustly distinguish between two different types of events, such as events that have a similar audio profile. The user device 110*b* (or another user device 110 associated with a user profile identifier for the user 105) may receive and/or capture audio 113 from that may occur within an environment of the user device 110*b*, where the environment may be an area surrounding the user device 110*b*, and the user device 110*b* is capable of "hearing"/capturing sounds occurring within the environment. The audio 113 may be from an event (e.g., door knock, hand clap, etc.) that may occur within the environment of the user device 110*b*. In some embodiments, the user device 110*b* may process the audio 113 using an acoustic front end (AFE) component 430 (shown in FIG. 4) for processing. The AFE component 430 may be configured to process the audio 113 and determine corresponding audio data 162, which may be acoustic feature data. For each audio 113 received by the user device 110*b*, the user device 110*b* may detect each audio 113, determine audio data 162 for each respective event (for example using microphone(s) 1120 and/or AFE 430) and send (step 1) the audio data 162 to the AED component 160.

The AED component 160 may include one or more trained machine learning (ML) models configured to process audio data 162 to detect occurrence of an acoustic event. The one or more ML models may include updated AED model 161 and may be trained using the training techniques and/or processes described in FIG. 1A, and may be configured to enforce mutual exclusivity between two event types with sufficiently similar audio characteristics, such that the one or more ML models may be configured to reduce a detection score of a first event type of the two event types when a detection score of a second event type increases.

In some embodiments, the AED component 160 may be configured to detect occurrence of one or more events from a set of event types (e.g., door knock, hand clap, glass breaking, fire/smoke alarm, etc.). The one or more ML models may include, but are not limited to, classifiers. The classifiers may be embodied in a neural network (e.g., convolution neural network (CNN), deep neural network (DNN), recurrent neural network (RNN), and the like). In some embodiments, the one or more ML models of the AED component 160 may be a single-label classifier, such that the AED component 160 may determine a label, representing a detected event, corresponding to the audio data 162. In some embodiments, the one or more ML models of the event detection component may be multi-label classifier, such that the AED component 160 may determine more than one label, representing a detected event, corresponding to the audio data 162.

The one or more detection scores of an ML model of the one or more ML models of the AED component 160 may represent a likelihood of a corresponding type of event being represented in the audio data 162. In some embodiments, a detection score may represent a confidence of the event detection component in detecting a type of event in the audio data. The score may be a binary value (e.g., 1 for detection or 0 for no detection) or some other score indicating a likelihood of detection (e.g., a score from 0 to 100 or the like). The AED component 160 may be configured to determine whether one or more detection scores of an ML model of the one or more ML models satisfy a threshold detection score. For example, if the detection score corresponding to a hand clap event type is 0.7 and the threshold detection score is 0.9, then the AED component 160 may determine that a hand clap event type is not represented in the audio data 162.

The AED component 160 may determine presence of an event type in the audio data 162 based on a detection score satisfying a threshold detection score. Based on the determination of an event type being present in the audio data 162, the AED component 160 may send (step 2) information (e.g., a message) corresponding to the detected event type to an action coordinator 180 of the system component(s) 120.

The action coordinator may receive (step 3) the acoustic event profile data 157 from the AED profile storage 155. The action coordinator 180, using the acoustic event profile data 157 may determine an action to be performed based on the detection of the event type. The action identified in the acoustic event profile data 157 may be based on instructions provided by the user 105 (e.g., sending a message to the user's mobile device, turning a light on in the user's home). In some embodiments, the action coordinator 180 may generate instructions to control a smart device 110*j*, via the network(s) 199. For example, the smart device 110*j* may be an automatic dog treat dispenser that is configured to dispense a dog treat when the event type of a dog barking is detected. The action coordinator 180 may determine the acoustic event profile data 157 indicates the user 105 should be notified for detection of the event type. The action coordinator 180 may send (step 4) data corresponding to the detected event type to the notification system component(s) 121.

The notification system component(s) 121 may generate notification data 956 (shown in FIG. 9) based on the detected event type. The notification system component(s) 121 may send the notification data 956 to the user device 110*a* (or another user device 110) associated with the user profile identifier for the user 105. Notifications may be sent to other people or applications, such as a security application, emergency contact(s) associated with the user and/or device, a landlord, or a care person (e.g., nurse in assisted living facility). Further details regarding the notification output are described below in relation to FIG. 9.

In some embodiments, one or more of the operations described above may be performed by the system component(s) 120, the user device 110*a*, the user device 110*b*, or another user device 110 associated with the user 105. For example, the system component(s) 120 may include an AED component 160 that is configured to process in a similar manner as the AED component 160 to detect occurrences of acoustic events.

As noted above, a device 110 may also be configured to perform object detection, using an object detection component 165 configured to operate on image data 114. Object detection component 165 may be configured to analyze image data 114 to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 165 may process at least a portion of the image data to determine feature data. The feature data is indicative of one or more features that are depicted in the image data. For example, the features may be face data, or other objects, for example as represented by stored data in profile storage 470. Other examples of features may include shapes of body parts or other such features that identify the presence of a human. Other examples of features may include edges of doors, shadows on the wall, texture on the walls, portions of artwork in the environment, and so forth to identify a space. The object detection component 165 may compare detected features to stored data (e.g., in profile storage 470, image data, or other storage) indicating how detected features may relate to known objects for purposes of object detection.

Once an object is detected by object detection component 165 the system may determine which object is actually seen using an object resolution component, not shown. Thus one component, such as object detection component 165, may detect if an object is represented in an image while another component, object resolution component may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 165 may determine that a type of object is represented in image data and an object resolution component, not shown may then determine which specific object is represented. The object resolution component may also make available specific data about a recognized object to further components so that further operations may be performed with regard to the resolved object.

Object detection component 165 may be configured to process image data to detect a representation of an approximately two-dimensional (2D) object (such as a piece of paper) or a three-dimensional (3D) object (such as a face). Such recognition may be based on available stored data (e.g., 470, etc.) which in turn may have been provided through an image data ingestion process. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

If an object is detected by OD 165 an indication of same may be sent to action coordinator 180 for performance of one or more actions in response to detection of the object. Such action(s) may be similar to those performed in response to detection of an acoustic event.

FIG. 2 is a flowchart illustrating operations of an example method 200 for detecting an acoustic event, according to embodiments of the present disclosure. The method 200 (illustrated in FIG. 2) may be performed by the system component(s) 120 and/or the device 110*b* of the system 100. For example, all operations may be performed by device 110*b*, all operations may be performed by system component(s) 120, or other configurations depending on operation of the system 100.

The method 200 may include receiving (202) audio data 162, at the device 110*b*, representing audio 113. As described above in reference to FIG. 1D, a user device 110 may capture event audio 113 from an event that may occur within an environment of the user device 110 and the AFE component 430 may be configured to process the audio 113 and determine corresponding audio data 162.

The method 200 may include processing (204) the audio data 162 using AED component 160 (which may operate updated AED model 161) to detect one or more event types represented in audio data 162. As described above in reference to FIG. 1A, the AED component 160 may include one or more ML models configured and/or trained to process audio data to detect presence of event type in audio data 162.

The method 200 may include generating (206), using the AED component 160, a first detection score corresponding to a first event type. As described above, an ML model of the one or more ML models of the AED component 160 generates a detection score corresponding to a first event type by reducing a detection score corresponding to a second event type. A detection score corresponding to a detection event may be a numerical value between 0 and 1 (or between a different range of values) and may indicate a probability/likelihood of the detected event type being represented in the audio data 160. In some embodiments, the AED component 160 may determine that more than one event type is represented in the audio data 162 and may determine a respective detection score for each of the detected events. For example, if the AED component 160 is configured to detect four event types, then the output of the AED component 160 may be:

{detected event type=event type_1; detection score=0.2}
{detected event type=event type_2; detection score=0.9}
{detected event type=event type_3; detection score=0.3}
{detected event type=event type_4; detection score=0.2}

The AED component 160 may output a vector of detection scores, where the position of the detection score may correspond to a particular event type. For example, the output of the event detection component 160 may be the vector including the detection scores {0.2, 0.9, 0.3, 0.2}, where the detection scores in the vector may correspond to {event type_1, event type_2, event type_3, event type_4}. The probability indicated in the detection scores may also be referred to as confidence score/level of the AED component 160 in determining that the particular event type is represented in the audio data 162.

The method 200 may include determining (208) whether the detection score of the first event type satisfies a threshold detection score. In some embodiments, the AED component may be configured with one or more threshold detection scores for different event types. In some embodiments, the AED component 160 may receive one or more threshold detection scores for different event types from a component of system 100 (e.g., a threshold detection score component (not shown separately in FIG. 1A)). In some embodiments, the threshold detection score(s) may be predetermined and/or user defined. In some embodiments, the initial threshold score may be the same for each of the different types of events.

If the detection score satisfies a threshold detection score (for example, the detection score exceeds the threshold detection score), then the method 200 may include the action coordinator 180 determining (210) the performance of a routine, such as generating a notification and/or performing an action (e.g., sending a message indicating the detected event type, turning lights on, etc.) as defined by the acoustic event profile data 157. For some types of event types, once a notification has been generated or other action initiated, the AED component 160 may suppress detection of further occurrences of the event type for a period of time (e.g., 1 minute, 10 minutes, one hour, etc.). For example, a user 105 may wish to be notified if a door knock has been detected over a predetermined and/or a user defined amount of time (e.g., one minute). However, should the user 105 not be able to attend to the door as soon as they receive the notification, the user 105 may set a preference to suppress additional detections for a predetermined amount of (e.g., 10 minutes) so that the user 105 does not receive multiple notifications until they are able to attend to the door. Similarly, a user 105 may wish to be notified if an appliance, such as a washing machine, has been beeping for more than two minutes, and if the user 105 is not be able to attend to the appliance as soon as they receive the notification, the user 105 may set a preference to suppress additional detections so that the user 105 does not receive multiple notifications until they are able to attend to the appliance.

An AED system may be configured to detect sounds as determined by system developers. The AED system may also be configured to detect sounds as customized by individual user(s). Thus, the acoustic event may be personalized or customized for a specific sound corresponding to the user. For example, the AED component 160 may determine an acoustic definition, or fingerprint, for a dog bark of the user's dog. The acoustic definitions for the specific acoustic event may be stored in the acoustic event profile data 157. The AED component 160 may use the acoustic definitions when the event data 162 is received to determine if an event is applicable to the user 105, and thus if the routine should be triggered. Utilizing user specific acoustic definitions may prevent routines from being triggered by sounds that are not applicable to the user. For example, a user may live in an apartment building where sounds from other apartments may be heard in the user's apartment. A general acoustic event for a dog barking may be triggered by both the user's dog or the dog belonging to the user's neighbor. An acoustic definition for the bark of the user's dog may prevent a routine from being triggered by the neighbor's dog.

The system 100 may receive acoustic definitions from a global source or database of sounds, such as sounds for different appliances and electronics. For example, a sound for a washing machine may be determined based on the brand of washing machine. A user profile, such as user profiles stored in profile storage 470 discussed below, may include the types of devices a user owns, such as the smart devices in the user's home. Thus, if the user requests to be notified when their microwave is beeping (e.g., "Tell me when my microwave has been beeping for a minute"), the AED component 160 may identify from the user profile that the user owns Brand X microwave and thus generates an acoustic definition specific to the known sound of the beep for Brand X microwaves. Acoustic definitions based on device type, brand, and/or model may be used to differentiate between the electronic sounds, or "beeps" of the devices. For example, a user may make two different requests, such as "tell me when the microwave is beeping" and "tell me when the washing machine is beeping," but based on the user term of "beeping," these may not be defined as two different sounds. However, the AED component 160 may differentiate between the two types of "beeps" using acoustic definition sound profiles based on the device type, brand, and/or model.

Figure 3:
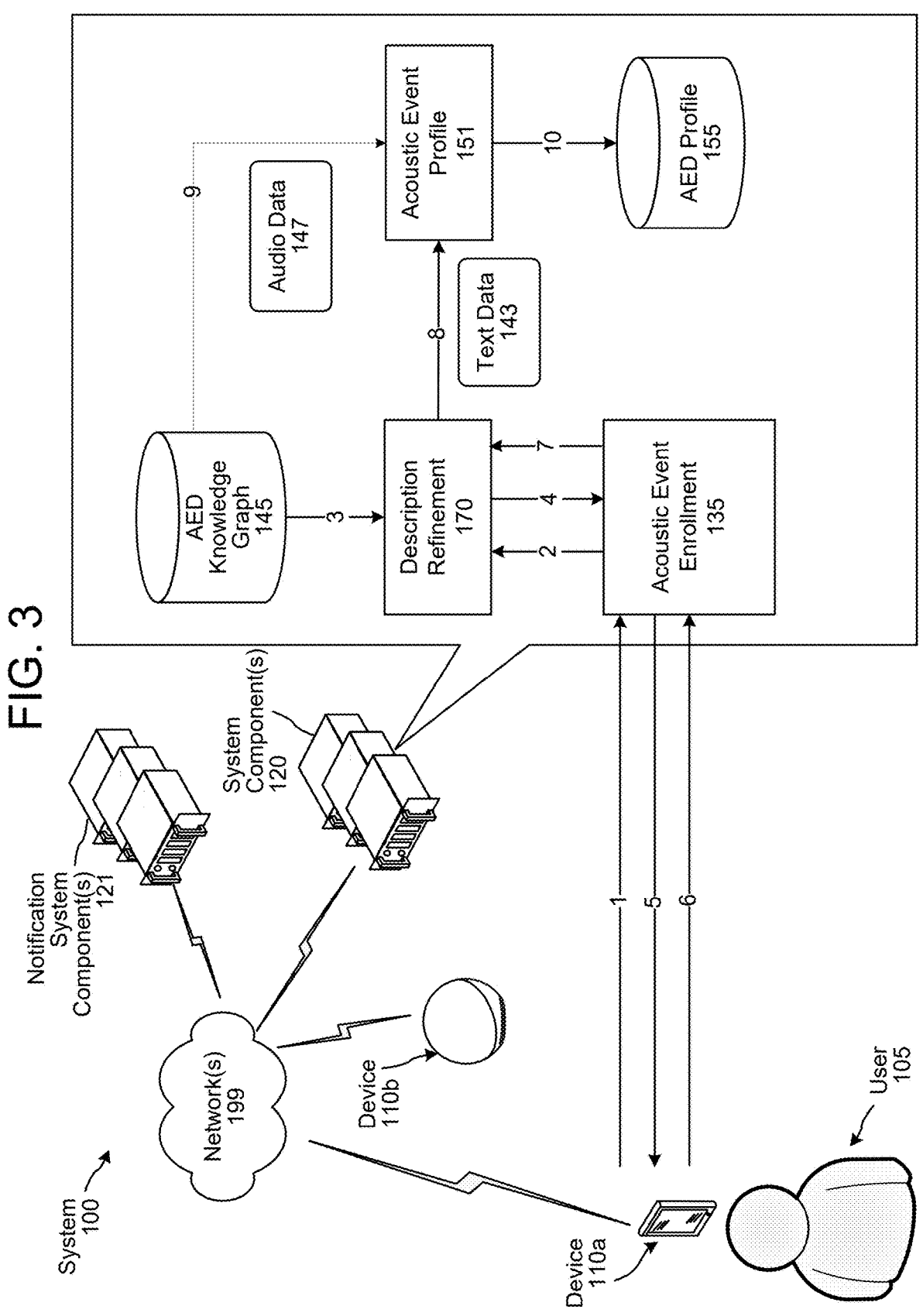
FIG. 3 illustrates the system configured to determine acoustic event profile data to detect the acoustic event type, according to embodiments of the present disclosure.

FIG. 3 illustrates a system 100 configured to receive and process a request to detect a user customized event type, according to embodiments of the present disclosure. The user 105 may provide one or more inputs via the user device 110a. The input(s) may indicate that the user 105 wants the system component(s) 120 to detect an acoustic event. Such input(s) may be provided via a companion application installed at the user device 110a and may be in various forms, such as, typed/text input, selection of graphical user interface elements (e.g., elements representing language choices potentially describing an acoustic event), voice input, etc. The input(s) may include a natural language description for the acoustic event. For example, the natural language description may be "dog barking" or "fridge door alarm." The user device 110a may send (step 1), to the system component(s) 120, data representative of the natural language description for the acoustic event. The data may be text data, token data, or other natural language representation data. The data may also include a selection of a pre-configured acoustic event that the system 100 is already configured to detect, subject to user enablement. For example, the system 100 may have a number of pre-configured detectable sounds such as glass breaking, baby crying, dog barking, etc. The user 105 may select one or more such sounds for the system 100 to detect within the user's environment. The data sent from the user device 110a to system component(s) 120 may be indicative of that selection.

The system component(s) 120 may include an acoustic event enrollment component 135 configured to facilitate enrollment for acoustic event detection. In some embodiments, the acoustic event enrollment component 135 may process the data (received in step 1), for example, the acoustic event enrollment component 135 may determine texting embedding data corresponding to the natural language description. The acoustic event enrollment component 135 may send (step 2) the data or the text embedding data corresponding to the natural language description to a description refinement component 170.

The system component(s) 120 include the description refinement component 170 configured to determine, in some cases, another or additional natural language description for the acoustic event. The description refinement component 170 may employ a rule-based engine to determine further natural language descriptions based on the user-provided natural language description. In some embodiments, the description refinement component 170 may be a conversational engine that may engage in a dialog exchange with the user 105 to determine the further natural language descriptions. The dialog exchange may involve a speech-based exchange, where the user 105 may provide voice inputs and the user device 110a may output audio representing synthesized speech. In other cases, the dialog exchange may involve a visual-based exchange, where the user 105 may provide inputs (e.g., text, selection of GUI elements, etc.) and the user device 110a may display text, graphics, icons, etc.

The description refinement component 170 enables collection of more detailed and fine-grained descriptions of an acoustic event by presenting options for further descriptions or asking questions regarding the initial description. For example, if the user-provided initial natural language description for the acoustic event is "dog barking", the description refinement component 170 may present output data representing "Is the dog a puppy?" or "Is it a puppy?" In response, the user 105 may provide an input (e.g., via touch selection, voice input, gesture, etc.) indicating "yes" or "no." As a further example, the description refinement component 170 may present output data representing "What is dog breed?" or "What kind of dog is it?" In response, the user 105 may provide an input indicating the breed/kind of dog. The responsive user inputs may be used to determine further or another natural language description for the acoustic event. For example, the description refinement component 170 may determine the natural language description of the acoustic event to be "[dog breed] puppy barking," based on the responsive user inputs.

In another example, if the user-provided initial natural language description for an acoustic event is "fridge door alarm", the description refinement component 170 may present output data representing "What is the fridge's brand?" In response, the user 105 may provide an input indicating the brand. The description refinement component 170 may determine the natural language description of the acoustic event to be "[brand] fridge door alarm," based on the responsive user inputs.

In some cases, the description refinement component 170 may not be able to determine a close match for the user-provided initial natural language description. For example, the user may request an acoustic event for a "microwave beep." If the description refinement component 170 cannot determine a match for the natural language description that meets a certain confidence (e.g., similarity) threshold with existing event profiles, the system may initiate a dialog with the user to determine if any related event profiles may be similar. The description refinement component 170 identify one or more event profiles having a text embedding (or word embedding) that bears some similarity to the text embedding of the natural language description. For example, the description refinement component 170 may identify event profiles such as "fan," "alarm," and/or "appliance beep." The description refinement component 170 may output sounds corresponding to the identified event profiles and ask the user if the sounds are similar to the desired event sound. Based on user responses, the description refinement component 170 may generate a new acoustic event profile based on the user-provided natural language description and an audio embedding based on the sounds that the user indicates are similar to the desired acoustic event sound.

The description refinement component 170 may use a rule-based engine to determine the questions to present or type of information to request from the user 105 based on the initial natural language description provided by the user 105. In other embodiments, the description refinement component 170 may determine the questions or type of information based on data stored at an AED knowledge graph storage 145.

The AED knowledge graph storage 145 may store AED text graph data 610 (shown in FIG. 6) representing multiple text embedding data (or word embedding data) corresponding to natural language descriptions of various different acoustic events. The AED text graph data 610 may cluster text embedding data based on semantic similarities. For example, text embedding data corresponding to "puppy barking" may be located close to text embedding data corresponding to "dog barking." Further details on the data stored at the AED knowledge graph storage 145 are described below in relation to FIG. 6.

The description refinement component 170 may determine first text embedding data corresponding to the initial natural language description (e.g., "dog barking") provided by the user 105. Then the description refinement component 170 may retrieve (step 3), from the AED knowledge graph storage 145, at least second text embedding data that is semantically similar to the first text embedding data. The retrieved second (or more) text embedding data may correspond to a natural language description (e.g., "puppy barking", "female dog barking", "male dog barking", "[breed] dog barking", etc.). Using at least the second text embedding data, the description refinement component 170 may determine a question or other form of output to present to the user 105. The output may be in the form of text data (or other type of data) and may represent a natural language output. In some embodiments, the description refinement component 170 may use natural language generation (NLG) techniques (implemented within the component 170 or as a separate component) to determine the natural language output. The description refinement component 170 may send (step 4) the output to the acoustic event enrollment component 135.

In some embodiments, the acoustic event enrollment component 135 may process the output received from the description refinement component 170 to present to the user 105 as displayed output or synthesized speech. For example, the acoustic event enrollment component 135 may send the output to a text-to-speech (TTS) component (for example included in the system component(s) 120 and configured to process in a similar manner as a TTS component 480) to generate audio data representing synthesized speech. The acoustic event enrollment component 135 may send (step 5), to the user device 110a, output data (e.g., text data, audio data, etc.) to present to the user 105, where the output data is based on the output received from the description refinement component 170. Presenting of the output may cause the user device 110a to present a question or request for information, for example, "Is it a puppy?", "What is the dog breed?", "What is the fridge brand?", "Does it sound like a fan?", "Does it sound like an alarm?", "Is it similar to an appliance beep?", etc.

In response to the output data, the user 105 may provide a user input via the user device 110a, which may represent an answer to the question or provide the requested information. The user device 110a may send (step 6), to the acoustic event enrollment component 135, input data corresponding to the user input. For example, the user may say "Yes." Or "Yes it is/does." If the presented output corresponds to the acoustic event. If the sound does not correspond to the acoustic event, however, the user may reply "No." "No it is/does not." Or the like. The acoustic event enrollment component 135, in turn, may send (step 9) the input data to the description refinement component 170.

The description refinement component 170 may determine, based on any additional text embedding data retrieved from the AED knowledge graph storage 145 (in step 3), whether additional information is needed to further refine the natural language description for the acoustic event. If additional information is needed, the description refinement component 170 may cause additional questions or requests for information to be presented in a similar manner as described above in relation to steps 4 and 5. As described below in relation to FIG. 6, one node/natural language description may be connected to one or more nodes/other natural language descriptions in the AED text graph data 610. For example, a node representing "dog sound" may be connected to nodes representing "dog bark", "dog snort", "dog whine", etc. The "dog bark" node may be connected to further nodes representing "puppy bark", "[first breed] dog bark", etc. In some cases, the description refinement component 170 may not identify any connected nodes; but rather may identify one or more related nodes (e.g., nodes that may be close to the text embedding of the natural language description). For example, if the description refinement component 170 cannot identify a node corresponding to "microwave beep," it may identify "fan", "alarm", "dishwasher beep", or "appliance beep" from the AED knowledge graph storage 145. Based on these connected and/or related nodes, which may be retrieved from the AED knowledge graph storage 145, the description refinement component 170 may determine whether additional information is needed and determine the type of questions to elicit the additional information. The description refinement component 170 may receive (in step 7) additional information (in a similar manner as described in relation to step 6) related to the natural language description of the acoustic event.

Using the user input(s) responsive to the questions or requests presented at the user device 110a and the initial natural language description provided by the user 105, the description refinement component 140 may determine a natural language description for the acoustic event that the user 105 wants the system component(s) 120 to detect. The description refinement component 140 may send (step 8), to an acoustic event profile component 151, text data 143 (or text embedding data) representing the determined natural language description for the acoustic event. For example, the text data 143 may correspond to "[breed] puppy dog barking", "[brand] fridge door alarm", "microwave beep", etc.

The acoustic event profile component 151 may be configured to determine acoustic event profile data to be used to ultimately detect occurrence of the acoustic event. Based on the received natural language description, the acoustic event profile component 151 may retrieve (step 9), from the AED knowledge graph storage 145, audio data 147 corresponding to the text data 143. The audio data 147 may be determined from public sources or other sources, and may be an audio sample of an acoustic event associated with the natural language description represented in the text data 143. The audio data 147 may not be captured from the user 105 environment by the device(s) 110 associated with the user 105. The audio data 147 may be audio embedding data. In addition to the AED text graph data 610, the AED knowledge graph storage 145 may store AED audio graph data 620 (shown in FIG. 6) representing multiple audio embedding data corresponding to various different acoustic events. The AED knowledge graph storage 145 may further store data associating individual audio embedding data to corresponding text embedding data describing the respective acoustic event. For example, text embedding data corresponding to "dog barking" may be associated with audio embedding data corresponding to audio representing a dog bark. Further details on the data stored at the AED knowledge graph storage 145 are described below in relation to FIG. 6.

The acoustic event profile component 151 may receive data, to incorporate as part of the acoustic event profile, corresponding to creating an ongoing acoustic event based on the user input received in response to the ongoing request output data. The acoustic event profile component 151 may store (step 10) the acoustic event profile including the audio data 147 in an AED profile storage 155. The acoustic event profile may include a natural language description associated with audio data 147, for example, the text data 143. The acoustic event profile may include an indication that the acoustic event is an ongoing acoustic event, and if so, may include time period data indicating the duration of time to detect occurrences of the acoustic event. The acoustic event profile may include other data and/or metadata; for example, threshold confidence and/or similarity data, which may indicate how similar a detected sound may be to the audio data 147 to trigger an event notification. Such threshold data may be adjusted as system knowledge of the acoustic event profile is refined through, for example, user feedback based on detected events played back for the user. Additionally, the audio data 147 may be associated with a user profile identifier associated with the user 105. In this manner, the system component(s) 120 can determine audio data (from stored data) corresponding to an acoustic event based on a natural language description of the acoustic event.

The system component(s) 120 may also receive other data, which may include, for example, time data, image data, sensor data from other sensors in an environment, sensor data from a sensor(s) of the device(s) 110, or the like. Such other data may be used by the AED component 160 to determine whether an acoustic event occurred.

In some embodiments, the components of the AED component 160 may be configured after applying quantization techniques. Quantization is the process of transforming deep learning models to use parameters and computations at a lower precision. Some quantization techniques may involve a process of approximating a neural network that uses floating-point numbers by a neural network of low bit width numbers. Such techniques may reduce both the memory requirement and computational cost of using neural networks.

In some embodiments, the AED component 160 may employ streaming models. The system/device may acquire data (e.g., audio data) sequentially over time. Streaming models start processing the event audio 113 as it is received to begin identifying patterns, making decisions, etc. as the data is received.

To enhance user privacy by reducing or eliminating the need to share audio data captured by the user device 110, the system 100 may use self-supervised federated learning techniques to update various machine learning models used for acoustic event detection and/or classification. In an example operation, an encoder (e.g., an audio graph generator and/or a convolutional recurrent neural network 760) may be trained to extract audio features from an audio signal. A decoder may be trained to predict a subsequent portion of audio data (e.g., a subsequent frame of audio data represented by LFBE). The encoder and decoder may be trained using self-supervised learning to improve the decoder's predictions and, by extension, the quality of the audio feature data generated by the encoder. The system may apply federated learning to share encoder updates across devices. The system may fine-tune the classifier to improve inferences based on the improved audio feature data. The system may distribute classifier updates to the device(s) to update an on-device classifier.

If the system is operated by a user to recognize a new specific sound, such as in the manner described with regard to FIG. 3, the system may determine that the new specific sound is similar to a sound that the AED 160 is already configured to detect. Such a determination may occur by comparing audio characteristic data for the new sound with audio characteristic data for one or more sounds that are already recognizable by the system (e.g., a pre-configured sound). Such a determination may also occur by comparing the distance between a vector representation for the new sound with a vector representation of one or more sounds that are already recognizable by the system, such as those representations which may corresponds to AED audio graph data 620 discussed below in reference to FIG. 6. If a new sound is similar to a pre-configured sound the system may engage in model training such as described above to configure an AED model to be more capable of distinguishing between the new sound and the pre-configured sound. The same is true for recognizing a user-indicated object where the system may determine if such a new object is similar to a pre-configured object and if so the system may train/re-train an OD model to be more capable of distinguishing between the new object and the pre-configured object.

Although illustrated for updating an encoder in the context of acoustic event detection and/or object detection, the systems and methods described herein can be applied to encoders or other neural network components configured to extract features from various types of sequential data.

FIG. 4 is conceptual diagram illustrating a device 110, system component(s) 120 configured for detecting an acoustic event, and a system 100 for speech processing, according to embodiments of the present disclosure. The system 100 may operate using various components as described in FIG. 4. The various components may be located on same or different physical devices. For example, as shown in FIG. 4, some components may be disposed on a device 110, while other components may be disposed on system component(s) 120; however, some or all of the components may be disposed on the device 110. Communication between various components may thus occur directly (via, e.g., a bus connection) or across the network(s) 199.

An audio capture component(s), such as a microphone or array of microphones (e.g., 1120) of the device 110, captures input audio, such as the event audio 107, 113 and/or user audio 402 (e.g., speech/spoken inputs from a user(s)) and creates corresponding input audio data 411.

The device 110 may include an acoustic front end (AFE) component 430. The AFE component 430 may be configured to process the audio data 411 and determine acoustic feature data. The AFE component 430 may process the audio data 411 using a number of techniques, such as determining frequency-domain representations of the audio data 411 by using a transform such as a Fast Fourier transform (FFT) and/or determining a Mel-cepstrum corresponding to the audio data 411.

The AFE component 430 may include an analysis filterbank that processes one or more frames of the input audio data 411. The input audio data 411 may be a digital representation of an analog audio signal, which may represent the event 106 and correspond to the event audio 107 or the event 112 and correspond to the event audio 113. In other cases, where the device 110 captures audio data representing speech from the user 105, the audio data 411 may be a digital representation of an analog audio signal, which may represent the spoken input/user audio 402 from the user 105. The analysis filterbank may include hardware, software, and/or firmware for converting the time-domain representation of the audio data 411 into frequency-domain representation of the audio data 411. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins.

The AFE component 430 may include an energy estimation component, which may receive as input the frequency representation of the audio data 411, process the frequency representation to determine one or more values that represent an estimated energy of the frequency data, and output corresponding acoustic feature data for each audio frame. If M acoustic features are extracted, the acoustic feature data (e.g., acoustic feature data 722) may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filter-bank energies (LFBEs) of each bin. The acoustic feature data may thus include one or more LFBE vectors. In other embodiments, the energy estimation component may perform a linear cosine transform on the logarithm of the frequency data to determine Mel-frequency cepstrum coefficients (MFCC), which may instead or additionally be represented by the acoustic feature data. The dimension of each acoustic feature vector of the acoustic feature data may correspond to the number M of frequency bins.

In some embodiments, the AFE component 430 may process the audio data 411 as it is received/captured by the device 110 (i.e. in a streaming manner). As such, in some cases the audio data 411 may represent a portion of the event audio 107/113 or the user audio 402, and may not correspond to the entire event 106/107 or the entire spoken input from the user 105. For example, the event 106/112 may be a sound generated by an appliance, such as a beeping sound generated by a microwave, which may occur for 15 seconds. The device 110 may capture the corresponding event audio 107/113, and may generate the audio data 152 in 1-second increments/portions. In such cases, the acoustic feature data may correspond to the 1-second portion of the event audio 107/113.

In some embodiments, the AFE component 430 may process a portion/a set of frames of the audio data 411 at a time. For example, the AFE component 430 may perform windowing functions on the audio data 411 to create audio frames. The size of each audio frame may depend upon system configuration. In an example embodiment, each audio frame may include 25 milliseconds of the audio data 411, with an overlap of the next audio frame of 10 milliseconds of data, thus resulting in sliding window processing of the audio data 411. Performing a windowing function may include multiplying a time record by a finite-length window with an amplitude that varies smoothly and gradually toward zero at its edges. By performing such functions, the endpoints of the waveforms of respective frames of audio data meet, resulting in a continuous waveform without sharp transitions. The AFE component 430 may then perform further processing (e.g., FFT) that generates, from the waveforms in each audio frame, a corresponding acoustic feature vector included in the acoustic feature data.

In some embodiments, the device 110 may include one AFE component 430 that may process the audio data 411 to generate the acoustic feature data to be used by the AED component 160, and another AFE component 430 that may process the audio data 411 to generate acoustic feature data to be used by a wakeword detector 424. In other embodiments, the AFE component 430 may generate acoustic feature data that may be used by the AED component 160 and the wakeword detector 424.

The device 110 may also include one or more wakeword detectors 424 for detecting one or more wakewords for providing output and/or changing a state of the device 110, such as illuminating a light, activating a display screen, etc. As illustrated, the wakeword detector 424 is disposed on the device 110, while further speech-processing components are disposed on the system component(s) 120. The present disclosure is not, however, limited to only this arrangement of components, and any other disposition of components is within the embodiments of the present disclosure. For example, some or all of the speech processing may be performed by the device 110, and the device 110 may thus not send any audio data 411 to the system component(s) 120.

The device 110 may instead or in addition process the input audio data 411 to determine whether speech is represented therein. The device 110 may use various techniques to determine whether the input audio data 411 includes speech. In some examples, a voice-activity detector of the device 110 may apply voice-activity detection (VAD) techniques. Such VAD techniques may determine whether speech is present in audio data based on various quantitative aspects of the input audio data 411, such as the spectral slope between one or more frames of the audio data; the energy levels of the audio data in one or more spectral bands; the signal-to-noise ratios of the audio data in one or more spectral bands; or other quantitative or qualitative aspects. In other examples, the device 110 may include a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 424 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There may be one or more HMMs built to model the non-wakeword speech characteristics, which are named filler models. Viterbi decoding is used to search the best path in the decoding graph, and the decoding output is further processed to make the decision on wakeword presence. This approach may be extended to include discriminative information by incorporating a hybrid DNN-HMM decoding framework. In another example, the wakeword detector 424 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected by the wakeword detector(s) 424, the device 110 may begin transmitting the audio data 411 to the system component(s) 120. The input audio data 411 may include data corresponding to the wakeword; in other embodiments, the portion of the audio corresponding to the wakeword is removed by the device 110 prior to sending the input audio data 411 to the system component(s) 120. In the case of touch input detection, for example, the input audio data 411 may not include a wakeword.

In various embodiments, the wakeword detector(s) 424 may use one of a plurality of wakeword-detection models. Each model may be trained to detect a different wakeword. In some embodiments, a single model may detect multiple wakewords. Each wakeword may be associated with a different speech-processing system. Upon detection of a particular wakeword, the device 110 may send the audio data 411 (and/or an indication of detection of the wakeword) to its corresponding speech-processing system.

In various embodiments, the wakeword-detection model of the wakeword detector(s) 424 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 424 may determine a similarity score for the candidate wakeword based on how similar it is to the stored wakeword; if the similarly score is higher than the wakeword-detection threshold, the wakeword detector 424 determines that the wakeword is present in the audio data, and if the similarity score is less than the wakeword-detection threshold, the wakeword detector 424 determines that the wakeword not is present in the audio data. For example, if the candidate wakeword matches the stored wakeword very closely, the wakeword detector 424 may determine a similarity score of 100; if the candidate wakeword does not match the stored wakeword at all, the wakeword detector 424 may determine a similarity score of 0. If the wakeword detector 424 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Upon receipt by the system component(s) 120 and/or upon determination by the device 110, the input audio data 411 may be sent to an orchestrator component 440. The orchestrator component 440 may include memory and logic that enables it to transmit various pieces and forms of data to various components of the system, as well as perform other operations as described herein. The orchestrator component 440 may be or include a speech-processing system manager and/or one or more of the speech-processing systems 492, which may be used to determine which, if any, of the ASR component 450, NLU component 460, and/or TTS component 480 should receive and/or process the audio data 411. In some embodiments, the orchestrator component 440 includes one or more ASR components 450, NLU components 460, TTS components 480, and/or other processing components, and processes the input audio data 411 before sending it and/or other data to one or more speech-processing components 492 for further processing. In other embodiments, the orchestrator component 440 sends the input audio data 411 to one or more of the speech-processing components 492 for processing.

In some embodiments, the orchestrator 440 and/or speech-processing system manager communicate with the speech-processing systems 492 using an application programming interface (API). The API may be used to send and/or receive data, commands, or other information to and/or from the speech-processing systems 492. For example, the orchestrator 440 may send, via the API, the input audio data 411 to a speech-processing systems elected by the speech-processing system manager and may receive, from the selected speech-processing system 492, a command and/or data responsive to the audio data 411.

Each speech-processing system 492 may include an ASR component 450, which may transcribe the input audio data 411 into text data. The text data output by the ASR component 450 may represent one or more than one (e.g., in the form of an N-best list) ASR hypotheses representing speech represented in the input audio data 411. The ASR component 450 may interpret the speech in the input audio data 411 based on a similarity between the audio data 411 and pre-established language models. For example, the ASR component 450 may compare the input audio data 411 with models for sounds (e.g., acoustic units such as phonemes, senons, phones, etc.) and sequences of sounds to identify words that match the sequence of sounds of the speech represented in the input audio data 411. The ASR component 450 sends ASR data generated thereby to an NLU component 460, via, in some embodiments, the orchestrator component 440. The ASR data sent from the ASR component 450 to the NLU component 460 may include a single top-scoring ASR hypothesis or may include an N-best list including multiple ASR hypotheses. An N-best list may additionally include a respective score associated with each ASR hypothesis represented therein. An ASR hypothesis may include text data or token data (e.g., sub-word representations) corresponding to the words recognized from the audio data 411.

Each speech-processing system 492 may further include a NLU component 460 that determines a semantic interpretation of the word(s) or phrase(s) represented in the ASR data by determining one or more meanings associated with the word(s) or phrase(s) represented in the ASR data. The NLU component 460 may determine an intent representing an action that a user desires be performed and may determine information that allows a device (e.g., the device 110, the system component(s) 120, a skill component 490, skill system component(s) 425, etc.) to execute the intent. For example, if the ASR data corresponds to "play [song] by [artist]," the NLU component 460 may determine an intent that the system output music and may identify the indicated artist and the indicated song. For further example, if the ASR data corresponds to "what is the weather," the NLU component 460 may determine an intent that the system output weather information associated with a geographic location of the device 110. In another example, if the ASR data corresponds to "turn off the lights," the NLU component 460 may determine an intent that the system turn off lights associated with the device 110 or the user from whom the user audio data 402 is received.

The NLU results data may be sent (via, for example, the orchestrator component 440) from the NLU component 460 (which may include tagged text data, indicators of intent, etc.) to a skill component(s) 490. If the NLU results data includes a single NLU hypothesis, the NLU component 460 may send the NLU results data to the skill component(s) 490 associated with the NLU hypothesis. If the NLU results data includes an N-best list of NLU hypotheses, the NLU component 460 may send the top scoring NLU hypothesis to a skill component(s) 490 associated with the top scoring NLU hypothesis. As described above, the NLU component 460 and/or skill component 490 may determine, using the interaction score, text data representing an indication of a handoff from one speech-processing system 492 to another.

A skill component 490 may be software running on the system component(s) 120 that is, or is similar to, a software application. A skill component 490 may enable the system component(s) 120 to execute specific functionality in order to provide data or produce some other requested output. The system component(s) 120 may be configured with more than one skill component 490. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill system component(s) 425 may communicate with a skill component(s) 490 within the system component(s) 120 directly and/or via the orchestrator component 440. A skill system component(s) 425 may be configured to perform one or more actions. A skill may enable a skill system component(s) 425 to execute specific functionality in order to provide data or perform some other action requested by a user. For example, a weather service skill may enable a skill service(s) 490 to provide weather information to the system component(s) 120, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system component(s) 120 may include a skill component 490 dedicated to interacting with the skill system component(s) 425. A skill, skill device, or skill component may include a skill component 490 operated by the system component(s) 120 and/or skill operated by the skill system component(s) 425.

The speech-processing system 492 may include a TTS component 480 that generates audio data (e.g., synthesized speech) from text data or other natural language representation data using one or more different methods. Data input to the TTS component 480 may come from a skill component 490, the orchestrator component 440, and/or another component of the system. The data may include an indication of a speech-processing component and/or data responsive to a command.

The system component(s) 120 may include a user-recognition component 495 that recognizes one or more users associated with data input to the system component(s) 120. The user-recognition component 495 may take as input the audio data 411 and/or ASR data output by the ASR component 450. The user-recognition component 495 may perform user recognition by comparing audio characteristics in the input audio data 411 to stored audio characteristics of users. The user-recognition component 495 may also perform user recognition by comparing biometric data (e.g., fingerprint data, iris data, etc.), received by the system in correlation with the present user input, to stored biometric data of users. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system component(s) 120 may include profile storage 470. The profile storage 470 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage may store data corresponding to detection of an acoustic event; if, for example, the user 105 configures a device 110 after defining an acoustic event, data from the profile storage 470 corresponding to the event may be sent to the device 110.

The profile storage 470 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 110, the user profile (associated with the presented login information) may be updated to include information about the device 110. As described, the profile storage 470 may further include data that shows an interaction history of a user, including commands and times of receipt of commands. The profile storage 470 may further include data that shows when a second user was present to hear an indication of a handoff for a command uttered by a first user.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 100 may include one or more notification system component(s) 121 which may include an event notification component 428. Although illustrated as a separate system, notification system component(s) 121 may be configured within system component(s) 120, device 110, or otherwise depending on system configuration. For example, event notification component 428 may be configured within system component(s) 120, device 110, or otherwise. The event notification component 428 may handle sending notifications/commands to other devices upon the occurrence of a detected acoustic event. The event notification component 428 may have access to information/instructions (for example as associated with profile storage 470 or otherwise) that indicate what device(s) are to be notified upon detection of an acoustic event, the preferences associated with those notifications or other information. The event notification component 428 may have access to information/instructions (for example as associated with profile storage 470 or otherwise) that indicate what device(s) are to perform what actions in response to detection of an acoustic event (for example locking a door, turning on/off lights, notifying emergency services, or the like. Further detail regarding the event notification component may be found below with regard to FIG. 9.

Figure 5:
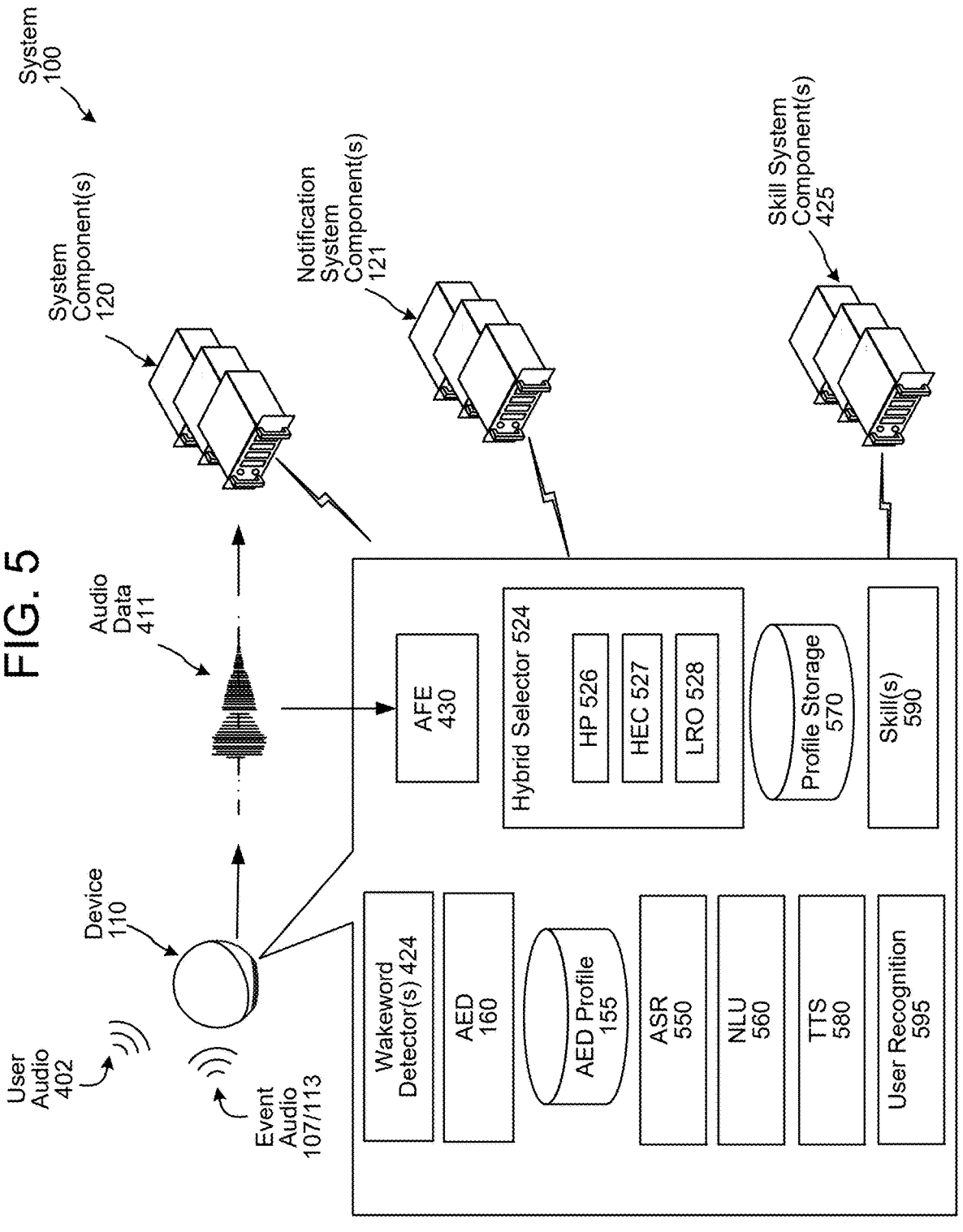
FIG. 5 is a conceptual diagram illustrating components that may be included in a device, according to embodiments of the present disclosure.

The foregoing describes illustrative components and processing of the system component(s) 120. The following describes illustrative components and processing of the device 110. As illustrated in FIG. 5, in at least some embodiments the system component(s) 120 may receive audio data 411 from the device 110, to recognize speech corresponding to a spoken natural language in the received audio data 411, and to perform functions in response to the recognized speech. In at least some embodiments, these functions involve sending directives (e.g., commands), from the system component(s) 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system component(s) 120 may be configured to provide other functions in addition to those discussed herein, such as, without limitation, providing step-by-step directions for navigating from an origin location to a destination location, conducting an electronic commerce transaction on behalf of a user 105 as part of a shopping function, establishing a communication session (e.g., an audio or video call) between the user 105 and another user, and so on.

The AFE components 430 may receive audio data from a microphone or microphone array; this audio data may be a digital representation of an analog audio signal and may be sampled at, for example, 256 kHz. The AED component 160 may instead or in addition receive acoustic feature data 722, which may include one or more LFBE and/or MFCC vectors, from the AFE component 430 as described above. The AFE component 430 for the AED components 160 may differ from the AFE component 430 for the wakeword detector 424 at least because the AED component 160 may require a context window greater in size that that of the wakeword detector 424. For example, the wakeword acoustic-feature data may correspond to one second of audio data, while the AED acoustic-feature data may correspond to ten seconds of audio data.

The wakeword detector(s) 424 may process the audio data 411 as described above, and may be configured to detect a wakeword (e.g., "Alexa") that indicates to the device 110 that the audio data 411 is to be processed for determining NLU output data. In at least some embodiments, a hybrid selector 524, of the device 110, may send the audio data 411 to the wakeword detector(s) 424. If the wakeword detector(s) 424 detects a wakeword in the audio data 411, the wakeword detector(s) 424 may send an indication of such detection to the hybrid selector 524. In response to receiving the indication, the hybrid selector 524 may send the audio data 411 to the system component(s) 120 and/or an on-device ASR component 550. The wakeword detector(s) 424 may also send an indication, to the hybrid selector 524, representing a wakeword was not detected. In response to receiving such an indication, the hybrid selector 524 may refrain from sending the audio data 411 to the system component(s) 120, and may prevent the on-device ASR component 550 from processing the audio data 411. In this situation, the audio data 411 may be discarded.

The device 110 may conduct its own speech processing using on-device language processing components (such as an on-device SLU component, an on-device ASR component 550, and/or an on-device NLU component 560) similar to the manner discussed above with respect to the speech processing system-implemented ASR component 450, and NLU component 460. The device 110 may also internally include, or otherwise have access to, other components such as one or more skills 590 (configured to process similar to the skills 490), a user recognition component 595 (configured to process in a similar manner to the speech processing system-implemented user recognition component 495), profile storage 570 (configured to store similar profile data to the speech processing system-implemented profile storage 470), a TTS component 580 (configured to process in a similar manner as the TTS component 480) and other components. In at least some embodiments, the on-device profile storage 5 70 may only store profile data for a user or group of users specifically associated with the device 110. Additionally, the device 110 may include an AED component 160 (configured to process similar to the AED component 160) and a AED profile storage 155 (configured to store data similar to the AED profile storage 155).

The AED component 160 may receive audio data from a microphone or microphone array; this audio data may be a digital representation of an analog audio signal and may be sampled at, for example, 256 kHz. The AED component 160 may instead or in addition receive acoustic feature data 722, which may include one or more LFBE and/or MFCC vectors, from the AFE component 430 as described above. The AFE component 430 for the AED component 160 may differ from the AFE component 430 for the wakeword detector 424 at least because the AED component 160 may require a context window greater in size that that of the wakeword detector 424. For example, the wakeword acoustic-feature data may correspond to one second of audio data, while the AED acoustic-feature data may correspond to ten seconds of audio data.

In at least some embodiments, the on-device language processing components may not have the same capabilities as the language processing components implemented by the system component(s) 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system component(s) 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system component(s) 120.

The hybrid selector 524, of the device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 may be sent to the HEC 527 using the HP 526. The HP 526 may also be configured to allow the audio data 411 to pass to the system component(s) 120 while also receiving (e.g., intercepting) this audio data 411 and sending the audio data 411 to the HEC 527.

In at least some embodiments, the hybrid selector 524 may further include a local request orchestrator (LRO) 528 configured to notify the on-device ASR component 450 about the availability of the audio data 411, and to otherwise initiate the operations of on-device language processing when the audio data 411 becomes available. In general, the hybrid selector 524 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 411 is received, the HP 526 may allow the audio data 411 to pass through to the system component(s) 120 and the HP 526 may also input the audio data 411 to the on-device ASR component 550 by routing the audio data 411 through the HEC 527 of the hybrid selector 524, whereby the LRO 528 notifies the on-device ASR component 550 of the audio data 411. At this point, the hybrid selector 524 may wait for response data from either or both the system component(s) 120 and/or the on-device language processing components. However, the disclosure is not limited thereto, and in some examples the hybrid selector 524 may send the audio data 411 only to the on-device ASR component 550 without departing from the disclosure. For example, the device 110 may process the audio data 411 on-device without sending the audio data 411 to the system component(s) 120.

The on-device ASR component 550 is configured to receive the audio data 411 from the hybrid selector 524, and to recognize speech in the audio data 411, and the on-device NLU component 560 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 560) may be selected as usable to respond to a natural language input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language input, to use directive data received from the system component(s) 120, assuming a remote response is even received (e.g., when the device 110 is able to access the system component(s) 120 over the network(s) 199), or to determine output data requesting additional information from the user 105.

The device 110 and/or the system component(s) 120 may associate a unique identifier with each natural language input. The device 110 may include the unique identifier when sending the audio data 411 to the system component(s) 120, and the response data from the system component(s) 120 may include the unique identifier to identify to which natural language input the response data corresponds.

In at least some embodiments, the device 110 may include one or more skill components 590. The skill component(s) 590 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Figure 6:
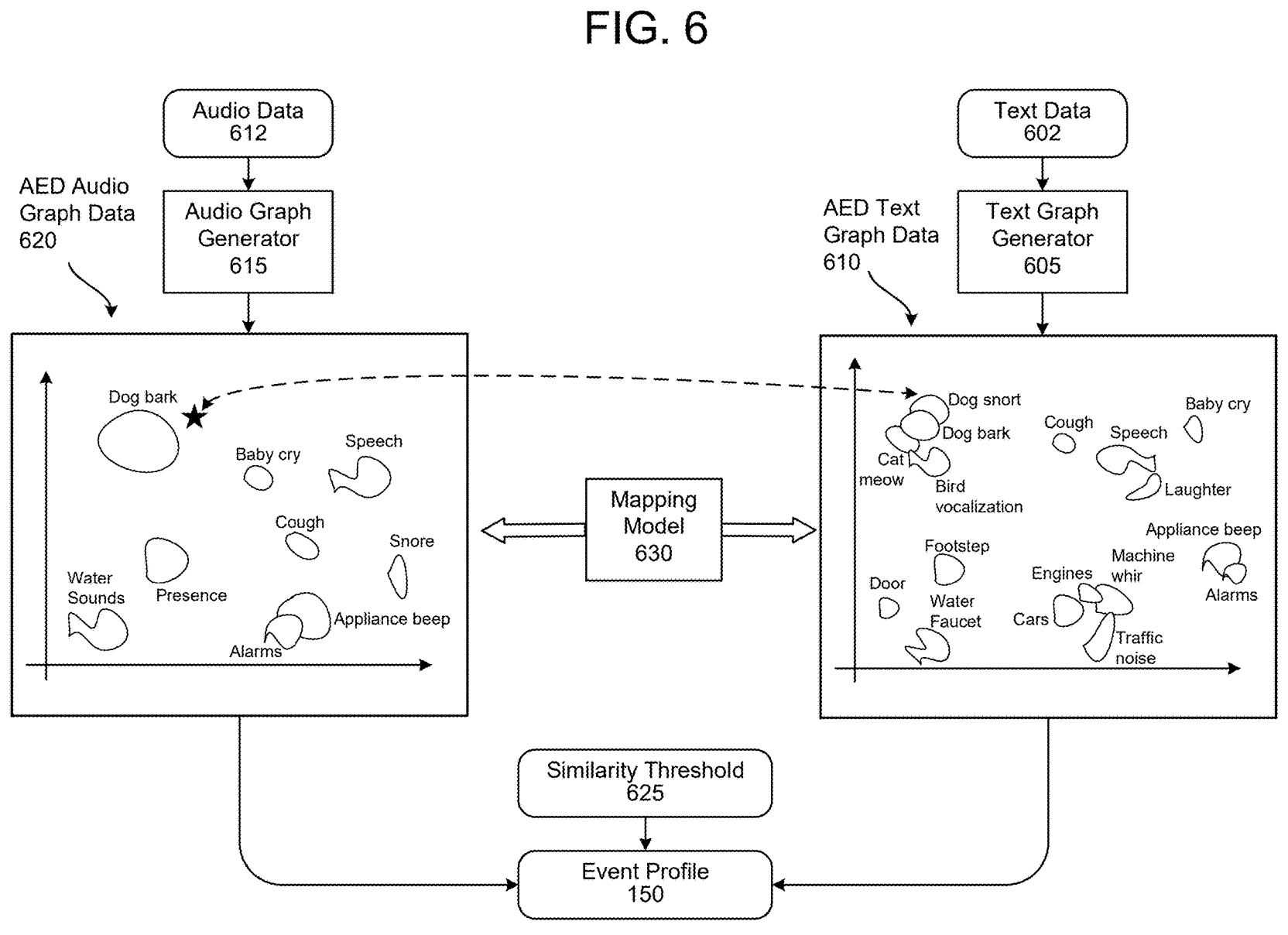

FIG. 6 is a conceptual diagram illustrating multi-view model training to align audio and text representation networks, with aligned concept space map to hierarchical knowledge graph, according to embodiments of the present disclosure. FIG. 6 illustrates how graph data, that may be stored at the AED knowledge graph storage 145, may be generated. A text graph generator 605 may generate AED text graph data 610 by processing text data 602. The AED text graph data 610 may represent relationships between various natural language descriptions for acoustic events based on the semantic meanings of the natural language descriptions. An audio graph generator 615 may generate AED audio graph data 620 by processing audio data 612. The AED audio graph data 620 may represent relationships between various audio data based on similarities in their corresponding acoustic features. The system 100 may further include a mapping model 630 to generate mappings between the text data represented in the AED text graph data 610 and the audio data represented in the AED audio graph data 620. Embedding vectors corresponding to encoded text and audio may be combined with similarity threshold data 625 to form an acoustic event profile. If a first embedding vector for one sound is a sufficient vector distance from a second embedding vector for another sound (e.g., if the vectors are within a certain threshold distance) those sounds may be considered similar. That similarity may impact the weight parameter used by the system 120, such as that described above in reference to FIG. 1A, to train an updated AED model 161 to more accurately distinguish between those sounds during runtime AED operations.

As described herein, one graph, AED text graph data 610, may integrate and represent relationships between natural language descriptions, which may be based on text embeddings. The AED text graph data 610 may be generated using text data 602. The text data 602 may be determined from public sources, such as the Internet, and/or more inputs provided by various users. In some embodiments, the text data 602 relates to acoustic events, and may not describe non-acoustic events. For example, the text data 602 may represent "dog barking", "fridge door alarm", "cat meow", etc. In other embodiments, the text data 602 may encompass various descriptions or words, and a text graph generator 605 may process the text data 602 to determine a subset of text data relating to acoustic events only. The text graph generator 605 may use part-of-speech (POS) tagging, named entity recognition (NER), and/or other techniques to determine text data relating to acoustic events.

In some embodiments, the text graph generator 605 may be a text representation network, such as a computer model configured to encode text/words into a semantic space. In some embodiments, the text graph generator 605 may include one or more neural networks that may process a corpus of text to learn word associations (e.g., using a word2vec or similar technique). So trained, the text graph generator 605 may represent a word with a list of numbers (e.g., a vector). The vector may represent a semantic embedding corresponding to the word that reflects the semantic and/or syntactic quality of the word. Thus, vectors that are close in the semantic space of the model may represent words that have similar meaning/use. A mathematical function (such as cosine similarity) may indicate a level of semantic similarity between two words represented by those vectors. In practice, when the description refinement component 170 cannot find a node in the AED knowledge graph storage 145 corresponding to the natural language description of "microwave beep", it may use the AED text graph data 610 to determine that vectors representing "appliance" and "alarm" are somewhat similar to the words in the natural language description.

In some embodiments, an example set of text relating to acoustic events may be used to determine further text data 602 relating to acoustic events from public sources. For example, starting with the example text "speech", the system may identify a public website that describes "speech", and then use POS tagging and/or NER based methods to extract words/entities related to "speech" from the website. For example, text such as "human vocal communication", "language", "lexicon of a language", "vocalization", etc. may be extracted from the website. The system may use one or more gating mechanisms that select the text that have high semantic similarities with the example text. In this manner, acoustic event-specific text data is extracted from public sources to maximize the richness of the text, evaluated by the text graph generator 605, while not including many irrelevant texts. The text graph generator 605 may use the determined words/entities as new nodes for the AED text graph data 610 when they are determined to be acoustic event relevant. The text corpus, for the AED text graph data 610, may be expanded by following related web pages, NER of existing text data/web pages, etc. as one acoustic event description may lead to discovery of multiple others during the search of relevant text data on the Internet.

Additionally, in some embodiments, user inputs may be used to contribute to the text corpus used to generate the AED text graph data 610. For example, a user may provide natural language descriptions of various different acoustic events through spoken inputs, using a companion application of the system component(s) 120, etc. Such user inputs may be anonymized and may not be associated with a user identifier, a device identifier, or other identifying information. Additionally, in some embodiments, user inputs provided when configuring the system component(s) 120 to detect acoustic events (e.g., natural language descriptions provided as described above in relation to FIG. 1B) may be used to generate the AED text data graph 610.

The determined AED-specific text corpus (e.g., the text data 605) may be used to fine-tune one or more generic text embedding models such that the structural relationships of different acoustic events are preserved. The fine-tuned text embedding model may then be used to encode the determined text data 605 into semantic representations, which may be vector data with a fixed dimension. The encoded text data may be used to build the vertices of the AED text graph data 610, which may reflect the high-level relationship between different acoustic events. In some embodiments, a vertex between acoustic event A and acoustic event B is determined to be valid by measuring the distance between the vector data/semantic representations of A and B (e.g., Euclidean distance of the two vectors) against a condition (e.g., a dynamic threshold) for similarity measure.

The text graph generator 605 may determine text embeddings for a natural language description for an acoustic event. In some embodiments, a word2vec technique may be used (that generates a 300 dimensional vector representation), and when the natural language description includes multiple words, an average of the vectors for the individual words may be used as the text embedding for the description. In other embodiments, the text graph generator 605 may employ a universal sentence encoder (e.g., that generates a 512 dimensional vector). In yet other embodiments, the text graph generator 605 may employ a tokenizer to identify words that are nouns, verbs or adjectives from the text corpus, and select words with high cosine similarities with respect to the corresponding labels using their vector representations. Then the average of the vector representations of the selected words weighted by their occurrences in the text corpus. This POS tagging-based word selection method makes the text embedding invariant to the order of concatenation of texts from various sources or multiple web pages. The text embeddings may be referred to as word embeddings, in some cases, and may correspond to sub-words, token data, etc.

In some embodiments, the audio data 612 relates to acoustic events and may have natural language descriptions that are included in the text data 602. The mapping model 630 is trained using labeled mappings between a portion of the audio data 612 and a portion of the text data 602. Not all of the descriptions represented in the text data 602 may have corresponding audio data, and not all of the audio data 612 may have a corresponding description. The mapping model 630 may process the AED text graph data 610 and the AED audio graph data 620 to determine bi-linear mappings between text embeddings that do not have a mapping to an audio embedding.

In some embodiments, the audio embeddings may be extracted from log mel spectrogram features of the audio data 612. In some embodiments, the mapping model 630 may use a dense layer (e.g., a 527-unit dense layer) with a sigmoid activation along with an audio encoder may be used to extract audio embeddings corresponding to the audio data 612. The mapping model 630 may be configured using a two-view alignment loss between text embeddings and audio embeddings as a regularizer to the supervised loss. In some embodiments, cosine similarity may be enforced for the multi-view alignment. In other embodiments, linear canonical correlation analysis loss may be used. An example overall loss equation is shown below, where a hyper-parameter a to adjust the relative importance of the supervised cross-entropy loss $L_{sup}$ and the embedding alignment loss $L_{cons}$:

$$L = E_i \left\{ L_{sup}(\hat{y}_i, y_i) + \alpha \frac{1_{r \in Eve(i)} L_{cons}(E_i, Me_i^r)}{\sum_r 1_{r \in Eve(i)}} \right\} \quad (1)$$

$$L_{sup} = y_i^T \cdot \log(\hat{y}_i) + (1 - y_i^T) \cdot \log(1 - \hat{y}_i) \quad (2)$$

$$L_{cons} = \frac{E_i \cdot Me_i^r}{\|E_i\| \cdot \|Me_i^r\|} \quad (3)$$

In equation (1) above, Eve(i) is the set of events present in audio i. The label description is $y_i$, the predicted description is $\hat{y}_i$, the audio embedding is $E_i$ and the text embedding is $e_i$. M is a matrix used to map the text embeddings into the same shape/space as the audio embeddings, which is shared across all the acoustic events. In equation (1) one acoustic event (amongst all events present in the label) is chosen at random (denoted as r in equations (1) and (3)) and use its text embeddings to calculate $L_{cons}$. As the number of epochs becomes sufficiently large, the stochastic implementation approximately converges to equation (1). The supervised loss $L_{sup}$ is updated regularly with all events present in each sample.

After the mapping model 630 is trained, it may be used to process audio data 612 that does not have a bi-linear mapping. At inference time, the mapping model 630 may process first audio data 612 to determine first text data 602 that represents a natural language description of the first audio data 612. The bi-linear mappings between the audio data 612 and the text data 602 may be stored at the AED knowledge graph storage 145. In some embodiments, the bi-linear mappings may be stored as data representing an association/correspondence between an audio embedding and a text embedding.

The stored bi-linear mappings may then be used to determine audio data corresponding to a user-provided natural language description for an acoustic event, as described in relation to FIG. 1B. That is, the system component(s) 120 may determine a natural language description (e.g., as provided by the user 105 or a refined version of the user-provided description), determine a text embedding corresponding to the natural language description, and determine a first node in the AED text graph data 610 that is semantically similar to the text embedding. Using the bi-linear mappings, the system component(s) 120 may determine a second node in the AED audio graph data 620 that is associated with the first node in the AED text graph data 610, and may use the audio data/audio embedding (e.g., the audio data 147) corresponding to the second node as a potential sample of the acoustic event described by the user 105.

When a user-provided natural language description is determined to be a novel node that is not already represented in the AED text graph data 610 (e.g. a user says "Alexa, I want to build a sound detector for my puppy dog whimper,"), the system determines an estimated degree of the node to determine how to insert the novel node into the AED text graph data 610. For example, "animal" may be a 'super-category' with the highest degree, "dog sound" and "cat sound" may be its 'sub-categories' that branch into multiple children nodes, and "dog bark" and "cat hiss" may be 'leaf nodes' which do not have children nodes. When a super-category is discovered, then some clusters may be broken up into smaller sub-graphs in order to fit in a new concept. On the other hand, when a leaf node is discovered, it is appended to end of an appropriate branch.

The AED text graph data 610 may be used to provide reference semantics in a "text view" to support various audio tasks when limited or no audio samples are available. For example, concept clusters may be built in both audio and text views. As text data is more readily available (from public sources), the concept clusters may be denser and more accurate in the text view than in the audio view. Using existing audio and text pairs, the mapping model 630 may be trained to determine a bi-linear mapping between the two views. Therefore, when expanding to a new acoustic event, the text representation and the learned bi-linear mapping may be used to estimate its audio representation. For acoustic events that share common "low-level" acoustic features, for example, "cat sound" and "dog sound" are both produced through the same biological pathway (i.e. lung→vocal fold→oral cavity→lips) and their sounds share similar sound production mechanism, the mapping model 630 may generalize well in generating the bi-linear mappings.

In some cases, the AED text graph data 610 may be used for making manual annotations for acoustic events more efficient. Because the AED text graph data 610 has a top-down structure, where a sub-graph or cluster embodies the concept of a "super-category" and the leaf nodes represent the more fine-grained description to summarize the target acoustic event, this may be leveraged this to help the manual annotators make faster decisions. With the AED text graph data 610 and the bi-linear map, a few plausible annotation paths may be predicted to assist the annotators to find the best descriptions for acoustic events present in an audio clip. Given a pair of audio embedding and text description, the system may propose top N paths for plausible events based on the likelihoods in a top-down order (super-category→sub-category→leaf node). For example, if an audio contains "dog cry", the system may propose the following few paths:

animal    sound→domestic    pets→dog    sound→dog bark→dog cry→puppy dog cry;

animal    sound→domestic    pets→dog    sound→dog bark→dog whimper→multiple dog whimper→multiple dog whimper and bark;

animal    sound→domestic    pets→cat    sound→cat meow→cat meow and hiss.

The AED text graph data 610 may be updated based on user inputs provided by multiple users. For example, the AED text graph data 610 may be updated to include natural language descriptions provided by the user 105 that are not already represented in the AED text graph data 610. The AED audio graph data 620 may be updated based on event audio (e.g., the event audio 113) that occurred in multiple user environments. For example, the AED audio graph data 620 may be updated to include audio embeddings that are not already represented in the AED audio graph data 620. The updated AED graph data may be used to process subsequently received user inputs requesting configuration of acoustic event detection. For example, a first user may provide a natural language description for a sound made by a particular brand of appliance, and the system component(s) 120 may capture event audio representing the sound made by the particular brand of appliance. The natural language description and the event audio may be integrated in the respective AED graph data 620, so that when a second user requests detection of the sound made by the particular brand of appliance, the system component(s) 120 may retrieve audio embedding data corresponding to the previously received event audio, and use the audio embedding data to detect occurrence of the sound made by the particular brand of appliance in the second user's environment.

FIG. 7 is a conceptual diagram illustrating components of an AED component 160, according to embodiments of the present disclosure. FIG. 7 illustrates components of the AED component 160. As shown, the AED component 160 may include a feature normalization component 750, a convolutional recurrent neural network (CRNN) 760, and a comparison component 770. These components may be configured to detect acoustic events defined by the user 105 of the devices 110.

The feature normalization component 750 may process the acoustic feature data 722 and may determine normalized feature data 752. The feature normalization component 750 may process the acoustic feature data 722, and may perform some normalization techniques. Different environments (e.g., homes, offices, buildings, etc.) have different background noises and may also generate event audio at different levels, intensities, etc. The feature normalization component 750 may process the acoustic feature data 722 to remove, filter, or otherwise reduce the effect, of any environmental differences that may be captured by the device 110 in the event audio 113, on the processing performed by the CRNN 760 and the comparison component 770. The feature normalization component 750 may use a normalization matrix derived by performing statistical analysis on audio samples corresponding to a wide range of acoustic events. In some embodiments, the feature normalization component 750 may be configured with the CRNN 760 and/or using the same training data.

The CRNN 760 may be an encoder that generates encoded representation data 762 using the normalized feature data 752. The CRNN 760 may include one or more convolutional layers followed by one or more recurrent layer(s) that may process the normalized feature data 752 to determine one or more probabilities that the audio data includes one or more representations of one or more acoustic events. The CRNN 760 may include a number of nodes arranged in one or more layers. Each node may be a computational unit that has one or more weighted input connections, a transfer function that combines the inputs in some way, and an output connection. The CRNN 760 may include one or more recurrent nodes, such as LSTM nodes, or other recurrent nodes, such as gated rectified unit (GRU) noes. For example, the CRNN 760 may include 128 LSTM nodes; each LSTM node may receive one feature vector of the acoustic feature data during each frame. For next frames, the CRNN 760 may receive different sets of 128 feature vectors (which may have one or more feature vectors in common with previously-received sets of feature vectors— e.g., the sets may overlap). The CRNN 760 may periodically reset every, for example, 10 seconds. The CRNN 760 may be reset when a time of running the model (e.g., a span of time spent processing audio data) is greater than a threshold time. Resetting of the CRNN 760 may ensure that the CRNN 760 does not deviate from the state to which it had been trained. Resetting the CRNN 760 may include reading values for nodes of the model—e.g., weights—from a computer memory and writing the values to the recurrent layer(s).

The CRNN 760 may be trained using ML techniques and training data. The training data, for the CRNN 760, may include audio samples of a wide variety of acoustic events (e.g., sounds from different types/brands of appliances, sounds of different types of pets, etc.). The training data may further include annotation data indicating which acoustic events are of interest and which acoustic events are not of interest. The CRNN 760 may be trained by processing the training data, evaluating the accuracy of its response against the annotation data, and updating the recurrent layer(s) via, for example, gradient descent. The CRNN 760 may be deemed trained when it is able to predict occurrence of acoustic events of interest in non-training data within a required accuracy.

The CRNN 760 may be configured to generate encoded representation data that accurately captures features that may be used to detect the predetermined acoustic events, whereas, the CRNN 760 may be configured to generate encoded representation data that may be used to detect a wider range of acoustic events, so that the CRNN 760 may be used to detect any acoustic event taught by the user 105.

The CRNN 760 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% likelihood that the acoustic-feature data represents the acoustic event, 1.0 represents a 100% likelihood that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities-which may be evenly distributed between 0% and 100%— into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 760 may be configured to convert a higher dimensional feature vector (the normalized feature data 752) to a lower dimensional feature vector (the encoded representation data 762). The CRNN 760 may process multiple frames of acoustic feature data 722, represented in the normalized feature data 752, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 760 may be configured by processing training data representing a variety of events; if the CRNN 760 processes two items of audio data from two events known to be different, but maps them to similar points in the embedding space, the CRNN 760 is re-trained so that it maps the training data from the different events to different points in the embedding space. Similarly, if the CRNN 760 processes two items of audio data from two events known to be similar, but maps them to different points in the embedding space, the CRNN 760 is re-trained so that it maps the training data from the similar events to similar points in the embedding space.

The comparison component 770 may be configured to process the encoded representation data 762 with respect to one or more acoustic event profile data 782 using a corresponding threshold 784. As described herein, the AED profile storage 155 may store the acoustic event profile data 782 and the corresponding threshold 784 based on the user 105 configuring the system component(s) 120 to identify an acoustic event. Each of the acoustic event profile data 782 may be acoustic feature data corresponding to a single individual acoustic event. For example, first acoustic event profile data 782a may correspond to a doorbell sound, second acoustic event profile data 782b may correspond to a particular breed dog bark, etc. Each of the thresholds 784 may be a threshold value of similarity, and may correspond to a single individual acoustic event. For example, a first threshold 784a may be a first threshold value corresponding to the first acoustic event profile data 782a, a second threshold 784b may be a second threshold value corresponding to the second acoustic event profile data 782b, etc.

The comparison component 770 may process the encoded representation data 762 with respect to each of the acoustic event profile data 782, and may determine how similar the encoded representation data 762 is to the acoustic event profile data 782. The comparison component 770 may determine such similarity using various techniques, for example, using a cosine similarity, using a number of overlapping data points within a feature space, using a distance between data points within a feature space, etc. The comparison component 770 may determine that the encoded representation data 762 corresponds to the acoustic event represented in the acoustic event profile data 782 when the similarity satisfies the corresponding threshold 784. The similarity may be represented as one or more numerical values or a vector of values, and the threshold 784 may be represented as single numerical value. In some embodiments, the average of the similarity values may exceed/satisfy the threshold 784 for the comparison component 770 to determine that the corresponding acoustic event occurred. As described herein, the encoded representation data 762 is a vector and the acoustic profile event data 782 is a vector, and in some embodiments, if each of the values of the encoded representation data 762 (e.g., each of the values of the N-vector) are within the threshold 784 of each of the corresponding values of the acoustic event profile data 782, the comparison component 770 may determine that the corresponding acoustic event occurred.

The comparison component 770 may evaluate the encoded representation data 762 with respect to each of the acoustic event profile data 782, and may determine, in some cases, that more than one acoustic event is represented in the event audio 113. For example, the comparison component 770 may process the encoded representation data 762 with respect to the first acoustic event profile data 782a to determine first similarity data that satisfies the first threshold 784a, and may process (in parallel) the encoded representation data 762 with respect to the second acoustic event profile data 782b to determine second similarity data that satisfies the second threshold 784b, and may then determine, based on both of the first and second thresholds 784 being satisfied, that the first and second acoustic events occurred.

The AED component 160 may output detected event data 772 representing one or more acoustic events occurred based on processing the event audio 113. The detected event data 772 may be an indication (e.g., a label, an event identifier, etc.) of the acoustic event represented in the event audio data 162. For example, the detected event data 772 may be data indicating that a dog barking event occurred. In some cases, the event audio 113 may represent more than one event occurrence, and the detected event data 772 may indicate that more than one of the acoustic events occurred. For example, the detected event data 772 may be data indicating that a dog barking event and a fridge door alarm event occurred. If the event audio 113 does not correspond to any of the acoustic events, then the detected event data 772 may be null, may indicate "other" or the like.

In some embodiments, the detected event data 772 may correspond to a portion of the event audio 113, for example, a set of audio frames that are processed by the AED component 160. The system component(s) 120 may include an event detection component that may aggregate the results (e.g., detected event data) of the AED component 160 processing sets of audio frames of the event audio data 162 corresponding to the event audio 113. The event detection component may perform further processing on the aggregated results/detected event data to determine an acoustic event represented in the event audio 113. Such further processing may involve normalizing, smoothing, and/or filtering of the results/detected event data.

In some embodiments, the AED component 160 may determine the detected event data 772 in a number of different ways. If multiple samples of the acoustic event is used/stored in the acoustic event profile data 782, the AED component 160 may encode each sample to a different point in the embedding space. The different points may define an N-dimensional shape; the comparison component 770 may deem that the encoded representation data 762 defines a point within the shape, or within a threshold distance of a surface of the shape, and thus, indicates occurrence of the corresponding acoustic event. In other embodiments, the AED component 160 may determine a single point that represents the various points determined from the various samples of the acoustic event. For example, the single point may represent the average of each of the values corresponding to the samples. The single point may further represent the center of the shape defined by the points.

The comparison component 770 may output the detected event data 772 indicating which, if any, of the acoustic events (indicated in the AED profile storage 155) occurred based on processing of the event audio 113. The detected event data 772 may include one or more labels or indicators (e.g., Boolean values such as 0/1, yes/no, true/false, etc.) indicating whether and which of the acoustic events occurred. In some embodiments, each of the acoustic event profile data 782 may be associated with an event identifier (e.g., a numerical identifier or a text identifier), and the detected event data 772 may include the event identifier along with the label/indicator.

The AED component 160 may output an indication of detection of an acoustic event as the detected event data 772. Such detected event data 772 may include an identifier of the acoustic event, a score corresponding to the likelihood of the acoustic event occurring, or other related data. Such detected event data 772 may then be sent, over the network(s) 199, to a downstream component, for example notification system component(s) 121/event notification component 428 or another device.

Figure 8:
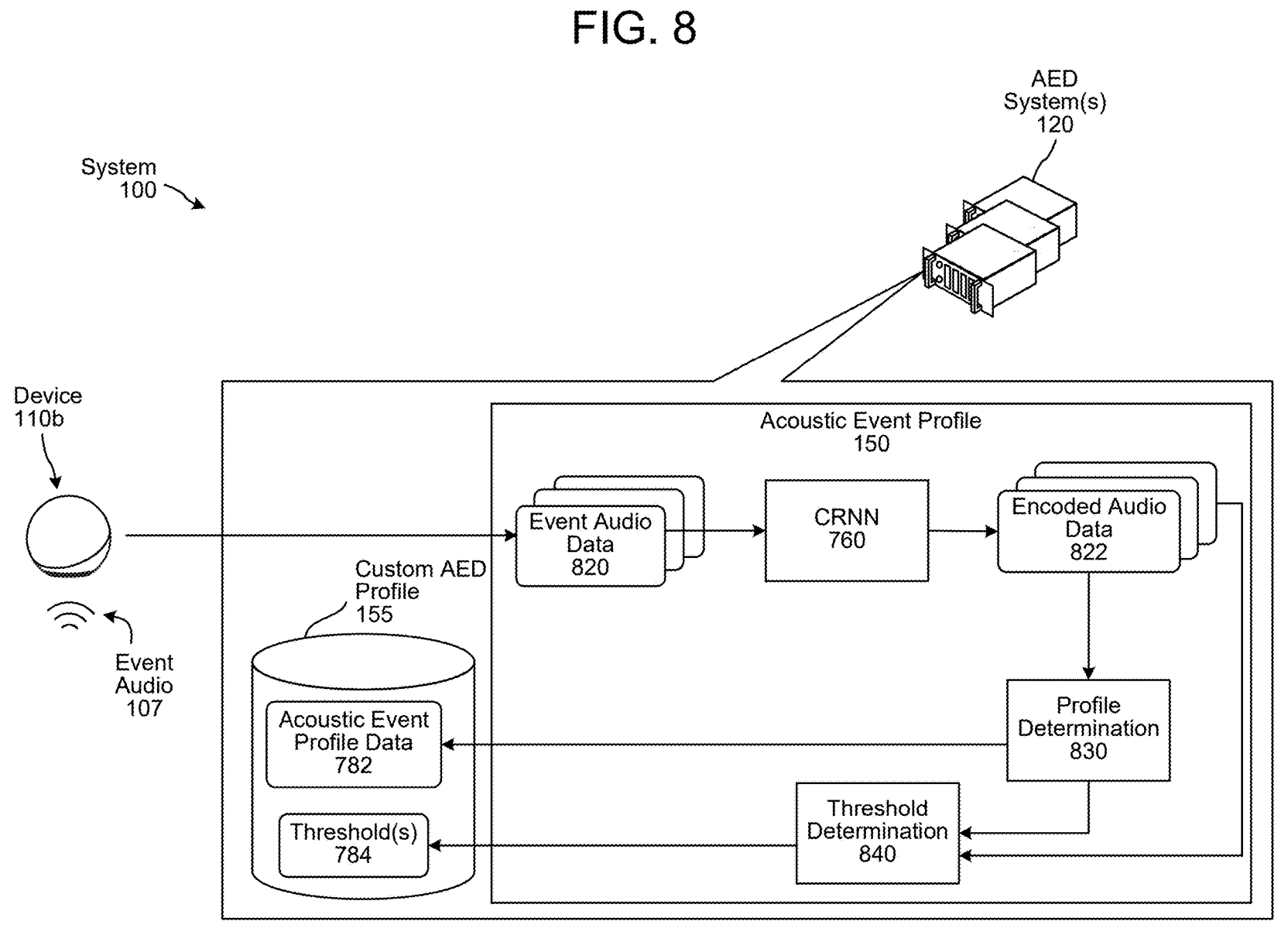

FIG. 8 illustrates the system 100 for generating the acoustic event profile data 782 for an acoustic event. In some cases, the system 100 may configure the AED component 160 to detect a sound selected by the user 105 of the device 110. The user 105 may interact with the device 110*a* using the speech-processing techniques described herein and command the device 110 to learn a new sound with a spoken input such as, "Alexa, I want to you learn a new sound." The device 110*a* and/or system component(s) 120 may determine the intent of the user 105 by processing corresponding audio data with the ASR and/or NLU techniques described herein. The device 110*a* and/or system component(s) 120 may identify the system component(s) 120 as the system to respond to the spoken input. The system component(s) 120 may cause the device 110*a* (and/or another device) to output a prompt asking the user 105 to provide a description of the sound that the user wants detected. The system component(s) 120 may further prompt the user 105 to confirm further or other natural language descriptions corresponding to the sound (as described above in relation to FIG. 1B). After determining audio data corresponding to the natural language description of the sound, the system component(s) 120 may determine and send event audio data representing occurrence of the sound to determine the acoustic event profile data.

The device 110*b* may receive event audio 107 representing occurrence of the sound. As described above in relation to FIG. 1D, the system component(s) 120 may determine whether the event audio 107 is a sample of the sound, and may send a prompt to the device 110*a* asking the user 105 to confirm that the event audio 107 represents occurrence of the sound. If the user's environment includes multiple devices 110, each one may receive the event audio 107 representing occurrence of the event. Each instance of the event audio 107 from each device 110 may be evaluated to determine a quality value, and the device 110 having the highest quality value may be selected for further processing. The quality metric may be, for example, a signal-to-noise ratio (SNR) of the audio, a loudness of a sound represented in the audio, or other such quality value. The audio may also be evaluated (by the device or the system) to determine a value corresponding to the sufficiency of the audio to provide reference data for the AED component 160 (e.g., a value representing how good the audio sample will be for training purposes. The value may be based at least in part on various factors such as signal quality, signal length, the appearance of background interfering noise (e.g., speech, unwanted overlapping sound, etc.), number of iterations of the audio data, or the like.

The device 110*b* may process the event audio 107 using an AFE component (e.g., the AFE component 430 described herein) to determine event audio data 820. In such embodiments, the event audio data 820 may be acoustic features, such as, a frequency-domain representation of the event audio 107, LBFE values corresponding to the event audio 107, MFCCs corresponding to the event audio 107, etc. In other embodiments, the event audio data 820 may be the audio data generated by the microphone(s) 1120 of the device 110*b*.

The acoustic event profile component 151 of the system component(s) 120 may process the event audio data 820 using the CRNN 760. The CRNN 760 may already be trained using samples representing a wide range of acoustic events, and may be configured as an encoder for audio data corresponding to a variety of acoustic events. The CRNN 760 may output encoded audio data 822, which is a vector of values, corresponding to the event audio data 820. The encoded audio data 822 may be processed by a profile determination component 830 to determine the acoustic event profile data 782.

The profile determination component 830 may be configured to determine whether additional samples of the acoustic event are needed based on the encoded audio data 822 received so far. In some embodiments, the acoustic event profile component 151 may require a predetermined number of samples of the acoustic event to be detected. Such predetermined number of samples may need to satisfy certain conditions, such as, audio quality, SNR, intensity, etc. Based on evaluating the received encoded audio data 822, the acoustic event profile component 151 may cause the system component(s) 120 to collect additional event audio 107 representing a potential sample of the acoustic event. When enough audio data is gathered, the acoustic event profile component 151 may determine the acoustic event profile data 782 and the threshold 784 for the instant acoustic event.

One or more of the points defined by processing the encoded audio data 822 corresponding to the occurrences of the acoustic event may be discarded by the event profile component 830. For example, if two or more points are determined to be relatively near each other in the embedding space, but one or more points are determined to be relatively far away from the two or more relatively near points, the relatively far-away point(s) may not be used when determining the vector data for the event profile 782 (e.g., when determining the shape, the center, or the average of the points). For example, the device 110 may collect event audio for three occurrences of the acoustic event, but audio data corresponding to one of the occurrences may include noise (e.g., a car horn honked while the doorbell was ringing). This noisy audio data may be identified by its distance, from the other points, in the embedding space, and therefore discarded.

In other embodiments, if there are at least three items of audio data that represent at least three occurrences of the acoustic event, the acoustic event profile component 151 may determine the shape, average, and/or center of the corresponding points in the embedding space using only two (or other subset) of the points determined from the encoded audio data 822 and then test the result using the third (or other additional) item of audio data. If processing the third item of audio data results in a point corresponding to the shape, average, and/or center determined from the first two items of audio data, the acoustic event profile component 151 may deem that the shape, average, and/or center accurately estimates the occurrence of the acoustic event and may be used to generate the acoustic event profile data 782. The acoustic event profile component 151 may further define the shape, average, and/or center using other combinations of subsets of the audio data and test the shape, average, and/or center with other items of audio data. If, for example, a certain combination of items of audio data results in a shape, average, and/or center that fails to process additional items of audio data to determine that those items correspond to the occurrence of the audio event, those combinations and/or items of audio data common to those combinations may be discarded, and the shape, average, and/or center may be determined using remaining instances of the encoded audio data 822.

The event audio data 820 may represent other audio beyond the event audio 107. In certain situations the system component(s) 120 may be configured to remove the extraneous audio prior to determining the encoded audio data 822 to be used for generating the acoustic event profile data 782. For example, if the system detects speech in the event audio data 820 (for example using a VAD/VAD techniques or other techniques disclosed herein) the system component(s) 120 may remove the portion of the audio data representing the speech, and may only proceed using the event audio data 820 with the speech portion removed.

The profile determination component 830 may determine the acoustic event profile data 782 to be a vector of values determined from processing the encoded audio data 822 corresponding to two or more samples of the event audio 107 for the acoustic event. As described above, the profile determination component 830 may evaluate the data points for each sample, determine a shape, a cluster, and/or an average of the data points, and the data points determined to fit the shape/cluster may be included in the acoustic event profile data 782. In other cases, the average of the data points may be included in the acoustic event profile data 782. The vector in the acoustic event profile data 782 may include values in a sequence/order corresponding to time, so that the acoustic event profile data 782 represents how the acoustic event is to sound over a duration of time. For example, a particular type of microwave may beep with increasing intensity over a period of 15 seconds, and the acoustic event profile data 782 may represent this information via the sequence/order of values in the vector.

The threshold determination component 840 may determine the threshold 784 for the instant acoustic event. In some embodiments, the threshold determination component 840 may process the acoustic event profile data 782 (generated by the profile determination component 830) and/or the encoded audio data 822 corresponding to two or more samples of the acoustic event. In some embodiments, the threshold determination component 840 may determine metrics corresponding to the encoded audio data 822. Such metrics may relate to false acceptance rate (FAR), false rejection rate (FRR), etc., and may be used to determine the threshold 784 for the instant acoustic event. The FAR and FRR metrics may be determined based on which data points fall outside of the shape/cluster used to determine the acoustic event profile data 782. The threshold determination component 840 may further perform aggregated estimation techniques using random/negative samples (samples other than the instant acoustic event samples), may augment the positive samples of the instant acoustic event, and may compare the random/negative samples and the positive samples using statistical analysis to determine the metrics and the threshold 784. The determined acoustic event profile data 782 and the corresponding threshold 784 may be stored in the AED profile storage 155.

In some embodiments, the CRNN 760 may be fine-tuned/retrained using event audio data 820 corresponding to one or more acoustic events taught by the user 105. In such cases, the CRNN 760 may be customized/fine-tuned for the user 105/the device 110. Such fine-tuning may enable the CRNN 760 to detect acoustic events for the user 105 more accurately than another CRNN that may be configured to for another user/set of acoustic events. For fine-tuning, training data may include multiple instances of event audio data 820, and the trained CRNN may be tested against the acoustic event profile data 782, for the acoustic events represented in the training data, to determine accuracy of the trained CRNN. In such embodiments, the fined-tuned/retrained CRNN 760 may be included in the AED component 160 for the device 110.

In some embodiments, the CRNN 760 may be updated/retrained and/or the AED storage 155 may be updated based on feedback received from the user 105 when the device 110 detects acoustic events (as described in relation to FIG. 1A). The device 110 (or another device) may output a notification of an acoustic event being detected, however, the user 105 may provide feedback (e.g., via a spoken input, touch input, gesture, etc.) that the acoustic event did not in fact occur, the notification is incorrect, the user did not want to be notified of this event, etc. Using such feedback, the system component(s) 120 may update the CRNN 760, the acoustic event profile data 782, and/or the threshold 784.

In some embodiments, the CRNN 760 may be updated/retrained and/or the AED profile storage 155 may be updated based on type of acoustic event or type of the source of the acoustic event. Some acoustic event sources may be dynamic and may change over time, while other acoustic event sources may be static and may not change. For example, a bark by a puppy is likely to have a different bark than the same dog as an adult. Based on the expected changes in the acoustic event source, the system component(s) 120 may prompt the user or initiate retraining and/or updating of data. For example, for natural language description "puppy bark" for an acoustic event, the system component(s) 120 may prompt retraining/updating at a time in the future (e.g., every 4 weeks for the next couple of months) to update at least the 69pprox.69c event profile data 157, so that a bark by the same dog is detected by the system component(s) 120 while the dog grows. The system component(s) 120 may prompt retraining on a periodic basis for a time period or until the event audio, captured in the user's environment, does not change significantly for a given time period (e.g., the dog has reached an adult age).

In some embodiments, the user 105 may wish to configure the device 110 to perform one or more "if-then" determinations based on two or more acoustic events. For example, the user 105 may not wish to be notified every time the device 110 detects that a microwave beeps; instead, the user may wish that the device 110 determines that, upon detection of the microwave beeping, it will send data to a second user device notifying the user 105 of the beeping only if it does not detect the sound of the door of the microwave opening and/or closing within a period of time after detection of the beeping (e.g., five minutes). The user 105 may speak an utterance specifying this condition and/or the system component(s) 120 may determine that such a condition is likely (e.g., determining that the first acoustic event corresponds to a timer expiring and cause output, by the device 110, of a prompt requesting the user 105 to cause occurrence of the second acoustic event (upon which the first acoustic event is dependent/conditioned on).

Figure 9:
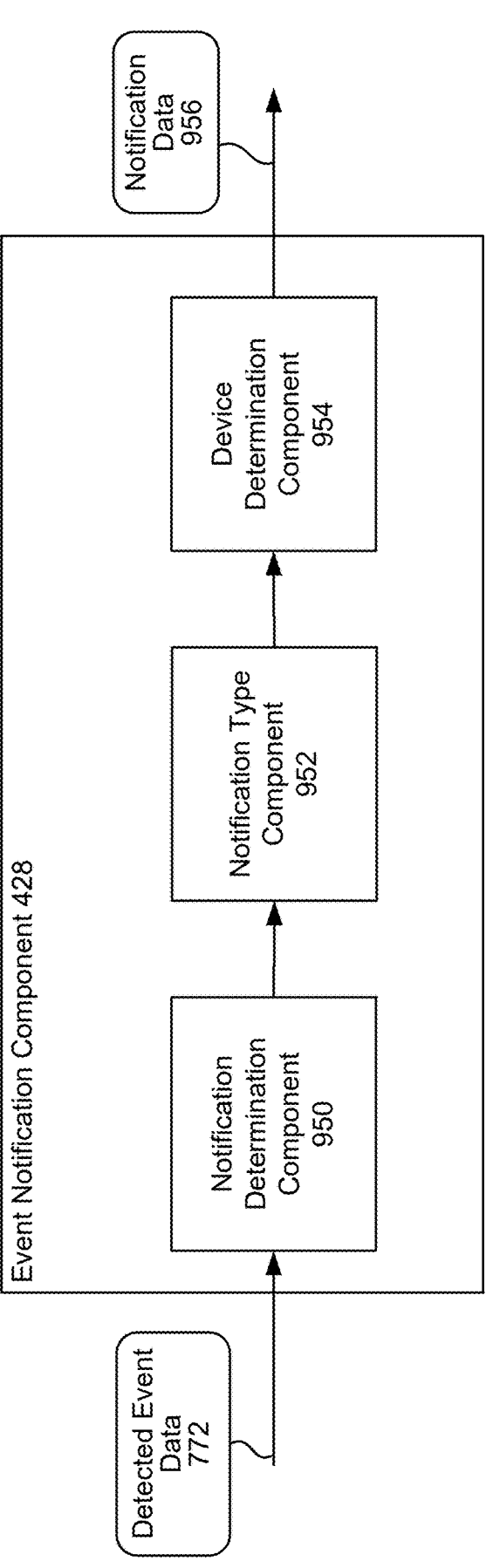
FIG. 9 illustrates an event-notification component according to embodiments of the present disclosure.

FIG. 9 illustrates example components of the notification system component(s) 121. As shown in FIG. 9, the event-notification component 428 may include a notification-determination component 950, a notification-type component 952, and/or a device-determination component 954. The notification-determination component 950 may receive one or more of the detected event data 772 and determine if a notification corresponding to the event(s) should be sent to one or more device(s). The detected event data 772 may, for example, indicate a first kind of event, such as glass breaking or a baby crying, and the notification-determination component 950 may determine that a corresponding notification should be sent to a user device. The detected event data 772 may, on the other hand, indicate a second kind of event, such as a dog bark, and the notification-determination component 950 may determine that no notification may be sent. The notification-determination component 950 may make this determination by determining data identifying the event and determining a corresponding user preference (as stored in, for example, the profile storage 470/570) for receiving notifications corresponding to the event. That is, a user of the device 110 may have input a preference for receiving a notification corresponding to a particular event, and the notification-determination component 950 may determine to send a notification based on the preference. In some embodiments, the notification-determination component 950 determines whether or not to send a notification based at least in part on the type of the event. For example, if the event corresponds to a potentially dangerous or rare event, such as glass breaking, the notification-determination component 950 may determine to send the notification.

The notification-type component 952 may determine the type of the notification to be sent. Types of notifications may include text messages, emails, phone calls, push notifications, or other such notifications. Like the notification-determination component 950, the notification-type component 952 may determine the type of the notification based on a user preference stored in the profile storage 470/570. The notification-type component 952 may similarly determine the type of the notification based on the type of the event, wherein potentially dangerous or rare events may correspond to a first type of notification, such as a phone call, while other types of events may correspond to a second type of notification, such as an email.

A device-determination component 954 may determine which of a potential plurality of user devices should receive the notification(s). In some embodiments, the device-determination component 954 may determine that the notification(s) (e.g., notification data 956) are to be sent to every device associated with a user account stored in the profile storage 470/570. In other embodiments, the device-determination component 954 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The system 100 may be used to create various acoustic event detection data for different events as detectable by different devices in different locations. For example, for a same acoustic event, the system may prompt the user to walk through audio capture by several different devices (for example one device in the living room, one device in the kitchen, etc.). The system 100 may instruct the user to cause the event and may capture acoustic data from multiple different devices while the event occurs. The system 100 may use this combined information to form one set of AED configuration data that may be used by multiple devices (e.g., jointly trained AED data goes to each device). Alternatively (or in addition) the system 100 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The system 100 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system may create one set of AED configuration data (e.g., trained AED model) for the acoustic event from a first location and another set of AED configuration data (e.g., trained AED model) for the acoustic event from a second location different from the first location. To do so the system may need to go through the training/prompting steps for each location and then may capture respective audio data corresponding to the respective location in order to train the separate AED model(s). The AED model(s) may then be loaded onto a device 110 which, when it attempts to detect a future event, may operate both AED model(s). Thus if a particular model is used to detect the event, the device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the device 110 may output an indication that the event was detected in location A.

In certain configurations, if the user replaces a device 110a at a particular location, the user may indicate to the system that the new device 110b will be located at the same location. The system may then send the appropriate AED configuration data (e.g., AED model(s)) to the new device 110b so the new device 110b may be configured to recognize the same acoustic events as the prior/replaced device 110a.

A physical location (e.g., a primary residence, a vacation home, a rental property, a hotel, an office, or other physical space, etc.) may include a variety of smart home devices. As used herein, a "smart home device" refers to a computing device that is capable of being controlled using speech, among other things. Example smart home devices include, but are not limited to, light switches, light bulbs, plugs, thermostats, door locks, microwaves, toasters, ovens, coffee makers, faucets, dishwashers, laundry machines (washers and dryers), televisions, and speakers. One or more of the user devices 110, associated with the user profile of the user 105, may be a smart home device.

Figure 10:
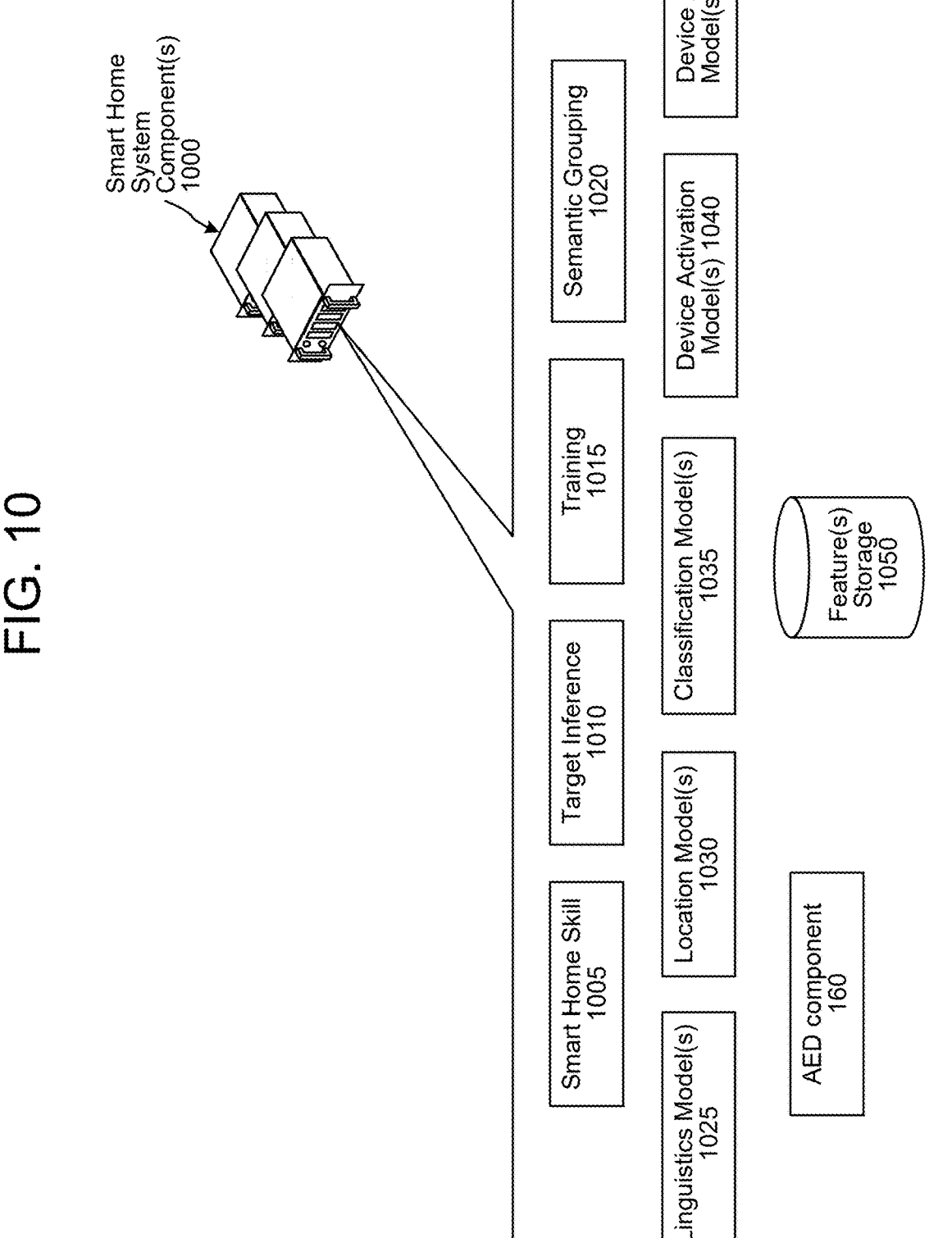
FIG. 10 is a conceptual diagram of components of a system for processing user inputs relating to smart home devices, according to embodiments of the present disclosure.

FIG. 10 is a conceptual diagram of components of smart home system component(s) 1000 for processing user inputs relating to smart home devices. For example, the user 105 may provide a spoken input relating to a smart home device, the system component(s) 120 may process the spoken input, and the system component(s) 120 may send data relating to the spoken input to the system component(s) 1000 for further processing. The system component(s) 1000 may process with respect to the spoken input (as described below) and may cause a smart home user device 110 to operate accordingly.

The system component(s) 1000 may also be used to control smart home devices in response to occurrence of certain acoustic events. For example, the system component(s) 120 may receive event audio from the user device 110b, may determine that the event audio represents footsteps, and may send, to the system component(s) 1000, data indicating that event audio representing footsteps is detected by the user device 110b. In response to receiving the data from the system component(s) 120, the system component(s) 1000 may cause a smart light to turn on, where the smart light may be located near/proximate to the user device 110b. As another example, in response to receiving the data, from the system component(s) 120, indicating footsteps are detected, the system component(s) 1000 may cause a user device 110d to generate an alert, when the user device 110d is in an "armed" mode.

The system component(s) 1000 may include a smart home skill 1005, a target inference component 1010, a training component 1015, a semantic grouping component 1020, one or more linguistics models 1025, one or more location models 1030, one or more classification models 1035, one or more device activation models 1040, one or more device affinity models 1045, the AED component 160, and a feature(s) storage 1050.

The smart home skill 1005 may be one of the skill components 490/590 and may be configured to receive NLU output data and attempt to determine which user device 110 is to be controlled. In some instances, the smart home skill 1005 may determine more than one user device 110 may correspond to a device to be controlled. In such an example, the smart home skill 1005 may call or otherwise request the target inference component 1010 perform target device resolution.

The target inference component 1010 may use data stored in the profile storage 470/570 and/or from audio data representing the spoken input along with one or more models to determine which user device 110 should be acted upon. For example, the target inference component 1010 may receive data from one or more sources as input into a classification model(s) 1035 for determining which user device 110 should be acted upon in light of device identifying information in the spoken natural language input. The data may include, for example, names of the user devices 110 associated with the device that received the spoken input, device-state data indicating historical activation and deactivation of the user devices 110, prior-request data indicating which user devices 110 were activated and/or deactivated recently, device affinity data indicating frequencies at which user devices 110 are controlled by speech controllable devices, current device state data indicating the state of user devices

110 at or near the time the spoken natural language input was received, and/or the audio data representing the spoken natural language input.

The one or more models may be configured to use some or all of this data to generate features for input into the classification model(s) 1035. For example, the linguistics model(s) 1025 may use the device identifying information from the spoken input and the names of the user devices 110 to determine semantic similarities for some or all device identifying information/name pairs. The features generated by the linguistics model(s) 1025 may include semantic-similarity scores for some or all of the pairs, with the most favorable score being associated with the device name that was determined by the linguistic model(s) 1025 to be most semantically similar to the device identifying information from the spoken natural language input. For example, the linguistics model(s) 1025 may determine "study light" to have a more favorable similarity score with respect to "office light" than "kitchen light" because "study" and "office" are more semantically similar than "study" and "kitchen." These features may be configured to be input include the classification model(s) 1035 and/or may be stored in the feature(s) storage 1050 for use by the classification model(s) 1035.

As to the linguistics model(s) 1025, machine learning techniques may be used to generate models that extract and/or use extracted names associated with the user devices 110 and calculate semantic similarities between the names and the device identifying information from the spoken natural language input. A device pair may be identified, determined, and/or generated for each pair of devices identifying information and user device 110. For example, a first pair may correspond to a user device 110a and the device identifying information, a second pair may correspond to a second user device 110b and the device identifying information, a third pair may correspond to a third user device 110c and the device identifying information, etc. The names associated with the user devices 110 may be analyzed with respect to the device identifying information, using the linguistics model(s) 1025, to determine a probability score for each pair.

In addition to, or instead of, using the linguistics model(s) 1025, the system component(s) 1000 may use the device activation model(s) 1040 to perform target device resolution. By way of example, the device activation model(s) 1040 may use the device-state data and/or the spoken natural language input data to determine probabilities that the user devices 110 are operated at the time when the spoken natural language input is received. A probability may be determined for some or all of the user devices 110 associated with the speech controllable device that received the spoken input. The features generated by the device activation model(s) 1040 may include device activation scores for some or all of the user devices 110, with the most favorable score being associated with the user device 110 that is most frequently operated during the time and/or within a time range that includes the time at which the spoken input was received.

For example, it may be determined that at or near a certain time of the day and/or day of the week, such as weekdays at 2:00 pm for example, a user device 110a with the name "office light" is activated frequently. If a spoken input is received by the system component(s) 120 at, for example, 2:04 pm, the device activation model(s) 1040 may determine that a higher probability exists that the "office light" device is the device to be acted upon rather than, for example, a "bedroom light" device, which is operated less frequently at or around 2:00 pm. These features may be configured to be input include the classification model(s) 1035 and/or may be stored in the feature(s) storage 1050 for use by the classification model(s) 1035.

As to the device activation model(s) 1040, rules-based and/or machine learning techniques may be used to generate models that extract and/or use timing information associated with when a user device 110 is turned on and/or turned off. The device activation model(s) 1040 may be configured to receive timing data. The timing data may be used to determine when user devices 110 are turned on and/or turned off. A threshold degree of usage similarity may be identified and/or determined and may be used to analyze whether a given device has a usage frequency that meets or exceeds the threshold degree of usage similarity.

In addition to, or instead of, using the linguistics model(s) 1025 and/or the device activation model(s) 1040, the system component(s) 1000 may use the device affinity model(s) 1045 to perform target device resolution. By way of example, the device affinity model(s) 1045 may use device affinity data to determine frequencies at which user devices 110 are operated by speech controllable devices. For example, some user devices 110 may be operated more frequently by one speech controllable device over another speech controllable device, such as user devices 110 in an office being operated more frequently by a speech controllable device situated in the office. A frequency and/or score indicating how frequent some or all of the user devices 110 are used by some or all of the speech controllable user devices 110 may be determined by the device affinity model(s) 1045. The features generated by the device affinity model(s) 1045 may include device affinity scores, with the most favorable score being associated with the user device 110 that is most frequently operated by the speech controllable device from which the spoken natural language input was received. These features may be configured to be input into the classification model(s) 1035 and/or may be stored in the feature(s) storage 1050 for use by the classification model(s) 1035.

As to the device affinity model(s) 1045, rules-based and/or machine learning techniques may be used to generate models that extract and/or use device affinity information associated with a frequency at which a user device 110 is caused to operate by given speech controllable devices. For example, a physical location may include two or more speech controllable devices, for example one in an office and one in a bedroom. The office speech controllable device may be frequently used to operate certain user devices 110, whereas the bedroom speech controllable device may be frequently used to operate other user devices 110. The device affinity model(s) 1045 may determine a frequency at which such speech controllable devices are used to operate the user devices 110. For example, device affinity data may be received by the device affinity model(s) 1045 for identifying which user devices 110 are operated by which speech controllable devices and frequencies associated with such operations.

A control rate may be identified for each pair of speech controllable device and user device 110. For example, a control rate of 0.9 may be determined for the interaction of a user device 110 with a first speech controllable device, a control rate of 0.1 may be determined for the interaction of the user device 110 with a second speech controllable device, a control rate of 0.8 may be determined for the interaction of a second user device 110 with the first speech controllable device, a control rate of 0.2 may be determined for the interaction of the second user device 110 with the second speech controllable device, etc. In this example, the device affinity model(s) 1045 may determine that the first device and the second device are frequently controlled by the first speech controllable device, making those devices candidates for target device resolution when the spoken natural language input is received from the first speech controllable device. In examples, a threshold control rate may be established and may be used to determine if a user device 110 is controlled by a particular speech controllable device with enough frequency to make the user device 110 a candidate for target device resolution.

In addition to, or instead of, using the linguistics model(s) 1025 and/or the device activation model(s) 1040 and/or the device affinity model(s) 1045, the system component(s) 1000 may use the location model(s) 1030 to perform target device resolution. For example, the location model(s) 1030 may use the device identifying information from the spoken natural language input to determine if the device identifying information corresponds to an environment naming, such as "kitchen," "office," "living room," etc. The features generated by the location model(s) 1030 may include confidence scores associated with environment names, with the most favorable score being associated with the environment name that most closely corresponds to the device identifying information. For example, if the spoken natural language input includes "turn on the kitchen lights," the location model(s) 1030 may identify "kitchen" as the device identifying information and may use that information to determine which user device 110 associated with the "kitchen" and/or with a name of "kitchen" is most likely to correspond to "kitchen lights" from the spoken natural language input. Additionally, or alternatively, the location model(s) 1030 may be configured to receive weather data indicating weather conditions at or near a location where the speech controllable device and/or the user devices 110 are situated. The weather data may be used to determine, for example, lighting conditions at the location and/or within a given space. For example, in instances where the weather data indicates that it is currently sunny and 95 degrees at the location, it may be less likely that the spoken natural language input corresponds to a request to turn on lights in a living room area. For further example, in instances where the weather data indicates it is currently cloudy and/or rainy, it may be more likely that the spoken natural language input corresponds to a request to turn on lights in a living room area.

Additionally, or alternatively, the system component(s) 1000 may be configured to use prior request data to generate features that include prior request scores. For example, multiple user devices 110 may be associated with a speech controllable device, and the prior request data may indicate a time at which a given user device 110 was operated in response to a spoken natural language input. The user device 110 that was operated closest in time to when the spoken natural language input was received may be more likely to correspond to the target device than other user devices 110. For example, a previous spoken natural language input may have been "turn on bedroom light." Thereafter, another spoken natural language input received 10 minutes later may be "turn off light." The prior request data may indicate the time at which the bedroom light was turned on, and upon receiving the spoken natural language input of "turn off light," the system component(s) 1000 may determine a prior request score as a feature for input into the classification model(s) 1035.

Additionally, or alternatively, the system component(s) 1000 may be configured to use current device state to generate features that include device state scores. For example, user devices 110 may be associated with states, such as "on," "off," "idle," "active," etc. A spoken input may include "turn off the light." In this example, the intent may be to deactivate or otherwise turn off a user device 110, but device identifying information was not provided in the spoken input. However, only a portion or only one user device 110 may be in a state that is "on" or similar, and this information may be used by the system component(s) 1000 to determine that other user devices 110 that are already in an "off" state are not likely candidates for target device resolution. Device state scores may be determined by the system component(s) 1000 as features for input into the classification model(s) 1035.

Additionally, or alternatively, the semantic grouping component 1020 may be configured to use the device identifying information from the spoken natural language input to determine semantic similarities and affinities to identify the user device 110 most likely to correspond to the device identifying information, even in instances where the name for the user device 110 has not been setup by the user and/or is associated with a default name, such as "light A," for example. For example, a spoken natural language input may include "turn on cooking lights," but the speech controllable device, that received the spoken natural language input, is not associated with a user device 110 with the name of "cooking lights." The semantic grouping component 1020 may determine a semantic similarity between the word "cooking" and one or more words from names typically used for user devices 110. For example, the system component(s) 1000 may determine that "cooking" is semantically similar to "kitchen." The system component(s) 1000 may then determine similarities between the semantically-similar word, here "kitchen," and device group names and/or names for speech controllable devices.

For example, the user may have assigned or otherwise selected "kitchen" as a name for a device group that includes user devices 110 located in the kitchen associated with the user, and/or the user may have assigned or otherwise selected "kitchen" as a name for the speech controllable device. Additionally, or alternatively, usage data aggregated from use of speech controllable devices in one or more other spaces may be used to determine that "cooking light" frequently refers to a user device 110 with a "light" device type that is generally given a name with the word "kitchen." Some or all of this information may be used by the semantic grouping component 1020 to determine that the user device 110 with the default name "light A," which is associated with the "kitchen" device group, and/or is associated with the "kitchen" speech controllable device, and/or that is associated with the usage data may be given the name "kitchen light," and may be acted upon in response to the spoken natural language input "turn on cooking light."

The features generated by the linguistics model(s) 1025, the device activation model(s) 1040, the device affinity model(s) 1045, the location model(s) 1030, and/or the semantic grouping component 1020 may be stored, in examples, in a feature(s) storage 1050 and may be retrieved by the classification model(s) 1035 to perform target device resolution. For example, device affinity scores may be predetermined before the spoken natural language input is received, and the corresponding features may be stored in the feature(s) storage 1050.

In examples, the target inference component 1010 may be unable to determine which user device 110 should be acted upon in light of the spoken natural language input and/or may be able to determine which user device 110 should be acted upon below a threshold confidence level. In these and other examples, the process may default to identifying the user device 110 using Levenshtein distances. Levenshtein distances may include a string metric for measuring the distance between two sequences. For example, the Levenshtein distance between two words is the minimum number of single-character edits required to change one word into the other. These techniques may be used to determine the Levenshtein distance between device identifying information from the spoken natural language input and names associated with user devices 110, with the shortest Levenshtein distance indicating the names to be selected by the system component(s) 1000.

Based at least in part on the features as described herein, the classification model(s) 1035 may determine which device(s) 110 is most likely to correspond to the device(s) intended to be acted upon. For example, the classification model(s) 1035 may generate output data representing a ranked list of the user devices 110, with the highest ranking user device 110 being the most likely device to be acted upon. The target inference component 1010 may provide the name and/or device identifier of the highest ranking user device 110 to the smart home skill 1005, for example, to generate directive data. The directive data may represent a directive for the speech controllable device and/or other components of the system component(s) 1000 to perform a directive, such as activation and/or deactivation, on the highest-ranking user device 110. Additionally, or alternatively, the TTS component 480/580 may generate audio data representing a request for the user of the speech controllable device to confirm that the identified user device 110 is the device the user intended for the system component(s) 1000 to act upon. Audio data representing the response of the user may be received at the system component 120 for processing, and if the response confirms that the user device 110 was selected accurately by the system component(s) 1000, the directive data may be sent to the speech controllable device.

Additionally, or alternatively, user responses to the target device resolution processes described herein may be used by the training component 1015 to train the one or more models of the system component(s) 1000 and/or to generate new models to be used for target device resolution. The training component 1015 may receive feedback data representing an indication that the target device corresponds to a given user device 110 and may generate, based at least in part on the feedback data, training data representing the indication as a target attribute. The training component 1015 may determine an association between the target attribute and at least one of the features or at least a portion of intent data as generated by the NLU component 460/560, and may generate, based at least in part on the association, a new classification model(s) to be used in place of the previous classification model(s) 1035.

FIG. 11 is a block diagram conceptually illustrating a device 110 of the system 100. FIG. 12 is a block diagram conceptually illustrating example components of a remote device, such as the system component(s) 120 and the skill system component(s) 425. The system component(s) (120/121/425/1000) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system component(s) (120/121/425/1000) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple system component(s) (120/121/425/1000) may be included in the system 100 of the present disclosure, such as, one or more system component(s) 120 and/or one or more skills 425. In operation, each of these systems may include computer-readable and computer-executable instructions that reside on the respective system component(s) (120/425), as will be discussed further below.

Each of these devices (110/120/121/425/1000) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/425) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/425) may also be connected to removable or external non-volatile memory and/or storage (such as a removable memory card, memory key drive, networked storage, etc.) through respective input/output device interfaces (1102/1202).

Computer instructions for operating each device (110/120/425) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/425) includes input/output device interfaces (1102/1202). A variety of components may be connected through the input/output device interfaces (1102/1202), as will be discussed further below. Additionally, each device (110/120/425) may include an address/data bus (1124/1224) for conveying data among components of the respective device. Each component within a device (110/120/425) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, 82pprox.imate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the system component(s) 120, and/or skill 425 may include their own dedicated processors, memory, and/or storage. Alternatively, one or more of the components of the device 110, the system component(s) 120, and/or skill 425 may utilize the I/O interfaces (1102/1202), processor(s) (1104/1204), memory (1106/1206), and/or storage (1108/1208) of the device 110, the system component(s) 120, and/or skill 425, respectively.

As noted above, multiple devices may be employed in a single system. In such a multi-device system, each of the devices may include different components for performing different aspects of the system's processing. The multiple devices may include overlapping components. The components of the device 110, the system component(s) 120, and the skill system 425, as described herein, are illustrative, and may be located as a stand-alone device or may be included, in whole or in part, as a component of a larger device or system.

Figure 13:
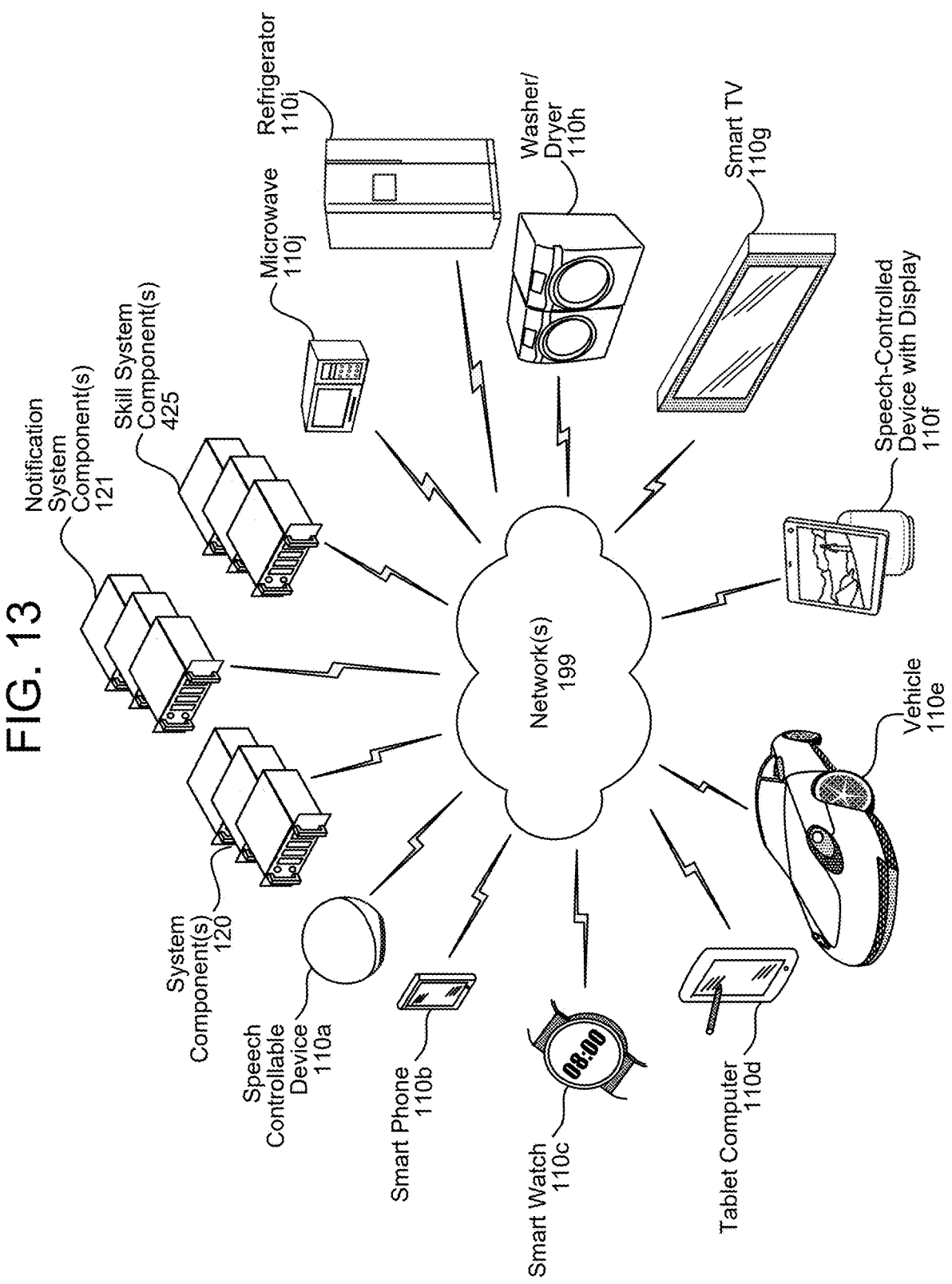
FIG. 13 illustrates an example of a computer network for use with the overall system, according to embodiments of the present disclosure.

As illustrated in FIG. 13, multiple devices (110a-110j, 120, 425) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system component(s) 120, the skill 425, and/or others. The support devices may connect to the network(s) 199 through a wired connection or wireless connection.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving training audio data representing an audio segment and ground truth data corresponding to labels for a plurality of first acoustic events including at least a first acoustic event and a second acoustic event;
generating, using a machine learning (ML) model, a first score corresponding to the first acoustic event and a second score corresponding to the second acoustic event;
based at least in part on the ground truth data indicating that the first acoustic event is represented in the audio segment and the second acoustic event is not represented in the audio segment, determining a regularizer function to enforce mutual exclusivity between the first acoustic event and the second acoustic event, wherein:
the regularizer function corresponds to adjusting a score corresponding to the second acoustic event to indicate a lower likelihood of the second acoustic event being represented in the audio segment;
determining first audio characteristic data corresponding to the first acoustic event is similar to second audio characteristic data corresponding to the second acoustic event;
determining, based at least in part on a similarity between the first audio characteristic data and the second audio characteristic data, a first weight parameter corresponding to a first pair of event types comprising the first acoustic event and the second acoustic event; and
training the ML model using the training audio data, the regularizer function, and the first weight parameter, to determine an updated ML model configured to determine, for the second acoustic event, an updated second score lower than the second score.

2. The computer-implemented method of claim 1, further comprising:
generating, using the first machine learning (ML) model, a third score corresponding to a third acoustic event;
determining the ground truth data indicates that the third acoustic event is not represented in the audio segment;
determining, based at least in part on a similarity between the first audio characteristic data and third audio characteristic data corresponding to the third acoustic event, a second weight parameter corresponding to a second pair of event types comprising the first acoustic event and the third acoustic event, wherein the second weight parameter is different from first weight parameter; and
training the ML model using the training audio data, the regularizer function, and the second weight parameter, to determine the updated ML model configured to determine, for the third acoustic event, an updated third score lower than the third score,
wherein the regularizer function is further determined to enforce mutual exclusivity between the first acoustic event and the third acoustic event.

3. The computer-implemented method of claim 1, wherein determining the regularizer function further comprises:
determining a third score by reducing the second score from a predetermined value; and
determining a fourth score based on a product of the first score and the third score, wherein the updated second score is based at least in part on the fourth score.

4. The computer-implemented method of claim 1, further comprising:
generating, using the ML model, a third score corresponding to a third acoustic event;
determining the ground truth data indicates that the third acoustic event is not represented in the audio segment; and
based at least in part on the third acoustic event being represented in the training audio data, refraining from determining a third weight parameter corresponding to a third pair of event types comprising the first acoustic event and the third acoustic event,
wherein the regularizer function is not configured to enforce mutual exclusivity between the first acoustic event and the third acoustic event.

5. A computer-implemented method comprising:

receiving first audio data;

generating, using the first audio data and a machine learning (ML) model configured to detect occurrence of one or more event types in audio data, a first detection score corresponding to a first event type and a second detection score corresponding to a second event type, the ML model being trained with a regularizer function and a first weight parameter to generate the second detection score, wherein:

the regularizer function corresponds to adjusting a score corresponding to the second event type to indicate a lower likelihood of the second event type being represented in the first audio data, and the first weight parameter is determined based at least in part on a similarity between the first event type and the second event type;

determining that the first detection score satisfies a threshold detection score; and in response to determining the first detection score satisfies the threshold detection score, generating output data representing detection of the first event type.

6. The computer-implemented method of claim 5, wherein the ML model is trained by:

determining first audio characteristic data corresponding to the first event type is similar to second audio characteristic data corresponding to the second event type;

determining the first weight parameter based on a similarity between the first audio characteristic data and the second audio characteristic data; and determining, based on the first weight parameter and the regularizer function, a first amount to reduce the score to generate the second detection score.

7. The computer-implemented method of claim 6, further comprising:

generating, using a training ML model and training audio data, a third detection score corresponding to a third event type, wherein the third detection score indicates a lower likelihood of the third event type being represented in the training audio data than a fourth detection score corresponding to the third event type, and wherein the third detection score is less than the fourth detection score by a second amount; and determining a second weight parameter based on a similarity between the third event type and the first event type, wherein the second amount is determined based on the second weight parameter.

8. The computer-implemented method of claim 5, wherein the ML model is trained by:

operating the regularizer function to enforce mutual exclusivity between the first event type and the second event type.

9. The computer-implemented method of claim 8, further comprising:

determining a first weight parameter corresponding to a first set of event types comprising the first event type and the second event type, wherein operating the regularizer function further comprises using the first weight parameter.

10. The computer-implemented method of claim 9, further comprising:

determining first audio characteristic data corresponding to the first event type and second audio characteristic data corresponding to the second event type; and determining the first weight parameter based at least in part on a similarity between the first audio characteristic data and the second audio characteristic data.

11. The computer-implemented method of claim 9, further comprising:

performing at least one training iteration using a training ML model, training audio data, the regularizer function, and the first weight parameter, to determine the ML model configured to determine, for the second event type, a third detection score indicating a lower likelihood of the second event type being represented in the training audio data than a fourth detection score corresponding to the second event type.

12. The computer-implemented method of claim 5, wherein the ML model is trained by:

generating, using a training ML model and training audio data, a third detection score corresponding to a third event type;

determining that ground truth data indicates that the third event type is represented in the training audio data; and based at least in part on the third event type being represented in the training audio data, refraining from determining a weight parameter corresponding to a set of event types comprising the first event type and the third event type, wherein the regularizer function is not configured to enforce mutual exclusivity between the first event type and the third event type.

13. A system comprising:

at least one processor; and at least one memory including instructions that, when executed by the at least one processor, cause the system to:

receive first audio data;

generate, using the first audio data and a machine learning (ML) model configured to detect occurrence of one or more event types in audio data, a first detection score corresponding to a first event type and a second detection score corresponding to a second event type, the ML model being trained with a regularizer function and a first weight parameter to generate the second detection score, wherein:

the regularizer function corresponds to adjusting a score corresponding to the second event type to indicate a lower likelihood of the second event type being represented in the first audio data, and the first weight parameter is determined based at least in part on a similarity between the first event type and the second event type;

determine that the first detection score satisfies a threshold detection score; and in response to determining the first detection score satisfies the threshold detection score, generate output data representing detection of the first event type.

14. The system of claim 13, wherein the ML model is trained by:

determining first audio characteristic data corresponding to the first event type is similar to second audio characteristic data corresponding to the second event type;

determining the first weight parameter based on a similarity between the first audio characteristic data and the second audio characteristic data; and determining, based on the first weight parameter and the regularizer function, a first amount to reduce the score to generate the second detection score.

15. The system of claim 14, wherein the ML model is further trained by:

generating, using a training ML model and training audio data, a third detection score corresponding to a third event type, wherein the third detection score indicates a lower likelihood of the third event type being represented in the training audio data than a fourth detection score corresponding to the third event type, and wherein the third detection score is less than the fourth detection score by a second amount; and determining a second weight parameter based on a similarity between the third event type and the first event type, wherein the second amount is determined based on the second weight parameter.

16. The system of claim 13, wherein the ML model is trained by:

operating the regularizer function to enforce mutual exclusivity between the first event type and the second event type.

17. The system of claim 16, wherein the ML model is further trained by:

determining a first weight parameter corresponding to a first set of event types comprising the first event type and the second event type, wherein operating the regularizer function further comprises using the first weight parameter.

18. The system of claim 17, wherein the ML model is further trained by:

determining first audio characteristic data corresponding to the first event type and second audio characteristic data corresponding to the second event type; and determining the first weight parameter based at least in part on a similarity between the first audio characteristic data and the second audio characteristic data.

19. The system of claim 17, wherein the ML model is further trained by:

performing at least one training iteration using a training ML model, training audio data, the regularizer function, and the first weight parameter, to determine the ML model configured to determine, for the second event type, a third detection score indicating a lower likelihood of the second event type being represented in the training audio data than a fourth detection score corresponding to the second event type.

20. The system of claim 13, wherein the ML model is trained by:

generating, using a training ML model and training audio data, a third detection score corresponding to a third event type;

determining that ground truth data indicates that the third event type is represented in the training audio data; and based at least in part on the third event type being represented in the training audio data, refraining from determining a weight parameter corresponding to a set of event types comprising the first event type and the third event type, wherein the regularizer function is not configured to enforce mutual exclusivity between the first event type and the third event type.

*   *   *   *   *